(12) United States Patent
Dowty

(10) Patent No.: US 11,535,381 B2
(45) Date of Patent: Dec. 27, 2022

(54) DEPLOYABLE CABIN ATTENDANT SEAT SYSTEM

(71) Applicant: B/E Aerospace, Inc., Winston-Salem, NC (US)

(72) Inventor: Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 46 days.

(21) Appl. No.: 17/239,248

(22) Filed: Apr. 23, 2021

(65) Prior Publication Data
US 2022/0340285 A1 Oct. 27, 2022

(51) Int. Cl.
*B64D 11/06* (2006.01)

(52) U.S. Cl.
CPC ................. *B64D 11/0691* (2014.12)

(58) Field of Classification Search
CPC ............ B64D 11/0691; B64D 11/0639; B64D 11/064; B60N 2/3018; B60N 2/3047
See application file for complete search history.

(56) References Cited

U.S. PATENT DOCUMENTS

| 4,799,632 | A | * | 1/1989 | Baymak | ............. | B64D 11/0691 |
| | | | | | | 297/14 |
| 6,672,662 | B1 | * | 1/2004 | Balk | .................... | B60N 2/3047 |
| | | | | | | 297/238 |
| 9,180,970 | B2 | | 11/2015 | Ehlers et al. | | |
| 9,260,190 | B2 | | 2/2016 | Ehlers et al. | | |
| 9,511,867 | B2 | | 12/2016 | Schliwa et al. | | |
| 10,479,508 | B2 | | 11/2019 | Joffre | | |
| RE47,872 | E | * | 2/2020 | Scott | .................. | B64D 11/0693 |
| 10,913,537 | B2 | | 2/2021 | Mariat et al. | | |
| 2014/0166808 | A1 | * | 6/2014 | Boenning | .......... | B64D 11/0698 |
| | | | | | | 244/118.6 |

(Continued)

FOREIGN PATENT DOCUMENTS

| EP | 2743183 | 4/2015 | |
| WO | WO-8801589 A1 | * 3/1988 | ......... B64D 11/0691 |

(Continued)

OTHER PUBLICATIONS

IPECO, URL: https://www.ipeco.com/products-and-services/aircraft-crew-seating/cabin-attendant/, Downloaded Mar. 14, 2021, 2 pages.

*Primary Examiner* — Richard R. Green
*Assistant Examiner* — Arfan Y. Sinaki
(74) *Attorney, Agent, or Firm* — Suiter Swantz pc llo

(57) ABSTRACT

A deployable cabin attendant seat system may include a primary cabin attendant seat, an auxiliary cabin attendant seat, a main support coupled to at least one of the primary cabin attendant seat or the auxiliary cabin attendant seat, and an actuation assembly coupled to at least the primary cabin attendant seat. The actuation assembly may be configured to actuate the primary cabin attendant seat relative to the auxiliary cabin attendant seat between a stowed seat position and a deployed seat position. The primary cabin attendant seat and the auxiliary cabin attendant seat may be arranged in a side-by-side configuration when the primary cabin attendant seat is in the deployed seat position. The primary cabin attendant seat may be stacked on the auxiliary cabin attendant seat when the primary cabin attendant seat is in the stowed seat position.

9 Claims, 20 Drawing Sheets

(56) References Cited

U.S. PATENT DOCUMENTS

| | | | |
|---|---|---|---|
| 2014/0312173 A1 | 10/2014 | Ehlers et al. | |
| 2014/0339364 A1* | 11/2014 | Ehlers | B64D 11/00 244/118.6 |
| 2019/0337623 A1 | 11/2019 | Vaninetti et al. | |

FOREIGN PATENT DOCUMENTS

| | | |
|---|---|---|
| WO | 0206117 A1 | 1/2002 |
| WO | 2020076369 A1 | 4/2020 |

* cited by examiner

DEPLOYABLE CABIN ATTENDANT SEAT SYSTEM

BACKGROUND

Aircraft cabin designs include cabin attendant seats for taxi, takeoff, or landing (TTOL) situations, turbulence, emergencies, or the like, as aviation guidelines and/or standards dictate that flight attendants be seated at these times. However, the aircraft cabin designs need to address competing interests for increased passenger seating, storage space, lavatories, and/or galley spaces in addition to the need for the cabin attendant seats.

SUMMARY

A deployable cabin attendant seat system is disclosed, in accordance with one or more embodiments of the disclosure. The deployable cabin attendant seat system may include a primary cabin attendant seat with a primary seat pan and a primary seatback. The primary seat pan may be configured to actuate between a primary stowed seat pan position and a primary deployed seat pan position. The deployable cabin attendant seat system may include an auxiliary cabin attendant seat with an auxiliary seat pan and an auxiliary seatback. The auxiliary seat pan may be configured to actuate between an auxiliary stowed seat pan position and an auxiliary deployed seat pan position. The deployable cabin attendant seat system may include a main support coupled to at least one of the primary cabin attendant seat or the auxiliary cabin attendant seat. The main support may be coupled to a floor of an aircraft cabin. The deployable cabin attendant seat system may include an actuation assembly coupled to at least the primary cabin attendant seat. The actuation assembly may be configured to actuate the primary cabin attendant seat relative to the auxiliary cabin attendant seat between a stowed seat position and a deployed seat position. The primary cabin attendant seat and the auxiliary cabin attendant seat may be arranged in a side-by-side configuration when the primary cabin attendant seat is in the deployed seat position. The primary cabin attendant seat may be stacked on the auxiliary cabin attendant seat when the primary cabin attendant seat is in the stowed seat position.

In some embodiments, the primary cabin attendant seat may be in the deployed seat position during a taxi, takeoff, or landing (TTL) stage of flight. The primary cabin attendant seat may be in the stowed seat position during a non-TTL stage of flight.

In some embodiments, the primary cabin attendant seat may be at least partially positioned within an opening defined between proximate aircraft interior structures installed in the aircraft cabin when the primary cabin attendant seat is in the deployed seat position. The opening may lead to a galley from at least one of an aisle or an egress area in the aircraft cabin. The primary cabin attendant seat may be removed from the opening when the primary cabin attendant seat is in the stowed seat position.

In some embodiments, the actuation assembly may include at least one hinge assembly coupled to at least the primary cabin attendant seat. The at least one hinge assembly may be configured to rotate the primary cabin attendant seat relative to the auxiliary cabin attendant seat between the stowed seat position and the deployed seat position.

In some embodiments, the primary cabin attendant seat may be configured to face the auxiliary cabin attendant seat when the primary cabin attendant seat is in the stowed seat position stacked on the auxiliary cabin attendant seat. The primary cabin attendant seat and the auxiliary cabin attendant seat may be configured to face outward when the primary cabin attendant seat is in the deployed seat position in the side-by-side configuration with the auxiliary cabin attendant seat.

In some embodiments, the primary seat pan may be configured to actuate between the primary stowed seat pan position and the primary deployed seat pan position when the primary cabin attendant seat is in the deployed seat position. The auxiliary seat pan may be configured to actuate between the auxiliary stowed seat pan position and the auxiliary deployed seat pan position when the primary cabin attendant seat is in the deployed seat position.

In some embodiments, the actuation assembly may include at least one linkage assembly coupled to at least the primary cabin attendant seat. The at least one linkage assembly may be configured to translate the primary cabin attendant seat relative to the auxiliary cabin attendant seat between the stowed seat position and the deployed seat position.

In some embodiments, the at least one linkage assembly may be configured to translate the primary cabin seat from the stowed seat position to an intermediate seat position in a first direction. The at least one linkage assembly may be configured to translate the primary cabin seat from the intermediate seat position to the deployed seat position in a second direction.

In some embodiments, the primary cabin attendant seat and the auxiliary cabin attendant seat may be configured to face a same direction when the primary cabin attendant seat is in the stowed seat position stacked on the auxiliary cabin attendant seat. The primary cabin attendant seat and the auxiliary cabin attendant seat may be configured to face outward when the primary cabin attendant seat is in the deployed seat position in the side-by-side configuration with the auxiliary cabin attendant seat.

In some embodiments, the primary seat pan may be configured to actuate between the primary stowed seat pan position and the primary deployed seat pan position when the primary cabin attendant seat is in the deployed seat position. The auxiliary seat pan being configured to actuate between the auxiliary stowed seat pan position and the auxiliary deployed seat pan position when the primary cabin attendant seat is in the deployed seat position.

In some embodiments, the primary seat pan may be configured to actuate between the primary stowed seat pan position and the primary deployed seat pan position when the primary cabin attendant seat is in the stowed seat position.

In some embodiments, the deployable cabin attendant seat system may include one or more interlocking assemblies configured to secure at least one of the primary cabin attendant seat in the stowed seat position, the primary cabin attendant seat in the deployed seat position, the primary seat pan in the primary stowed seat pan position, or the auxiliary seat pan in the auxiliary stowed seat pan position.

In some embodiments, the deployable cabin attendant seat system may include one or more spring assemblies configured to hold at least one of the primary seat pan in the primary stowed seat pan position or the auxiliary seat pan in the auxiliary stowed seat pan position.

In some embodiments, the deployable cabin attendant seat system may include one or more handles configured to assist in the actuation of at least one of the primary cabin attendant seat between the stowed seat position and the deployed seat position, the primary cabin attendant seat pan between the primary stowed seat pan position and the primary deployed seat pan position, or the auxiliary cabin attendant seat pan between the auxiliary stowed seat pan position and the auxiliary deployed seat pan position.

An aircraft cabin is disclosed, in accordance with one or more embodiments of the disclosure. The aircraft cabin may include a deployable cabin attendant seat system positioned proximate to at least one aircraft interior structure. The deployable cabin attendant seat system may include a primary cabin attendant seat with a primary seat pan and a primary seatback. The primary seat pan may be configured to actuate between a primary stowed seat pan position and a primary deployed seat pan position. The deployable cabin attendant seat system may include an auxiliary cabin attendant seat with an auxiliary seat pan and an auxiliary seatback. The auxiliary seat pan may be configured to actuate between an auxiliary stowed seat pan position and an auxiliary deployed seat pan position. The deployable cabin attendant seat system may include a main support coupled to at least one of the primary cabin attendant seat or the auxiliary cabin attendant seat. The main support may be coupled to a floor of the aircraft cabin. The deployable cabin attendant seat system may include an actuation assembly coupled to at least the primary cabin attendant seat. The actuation assembly may be configured to actuate the primary cabin attendant seat relative to the auxiliary cabin attendant seat between a stowed seat position and a deployed seat position. The primary cabin attendant seat and the auxiliary cabin attendant seat may be arranged in a side-by-side configuration when the primary cabin attendant seat is in the deployed seat position. The primary cabin attendant seat may be stacked on the auxiliary cabin attendant seat when the primary cabin attendant seat is in the stowed seat position This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
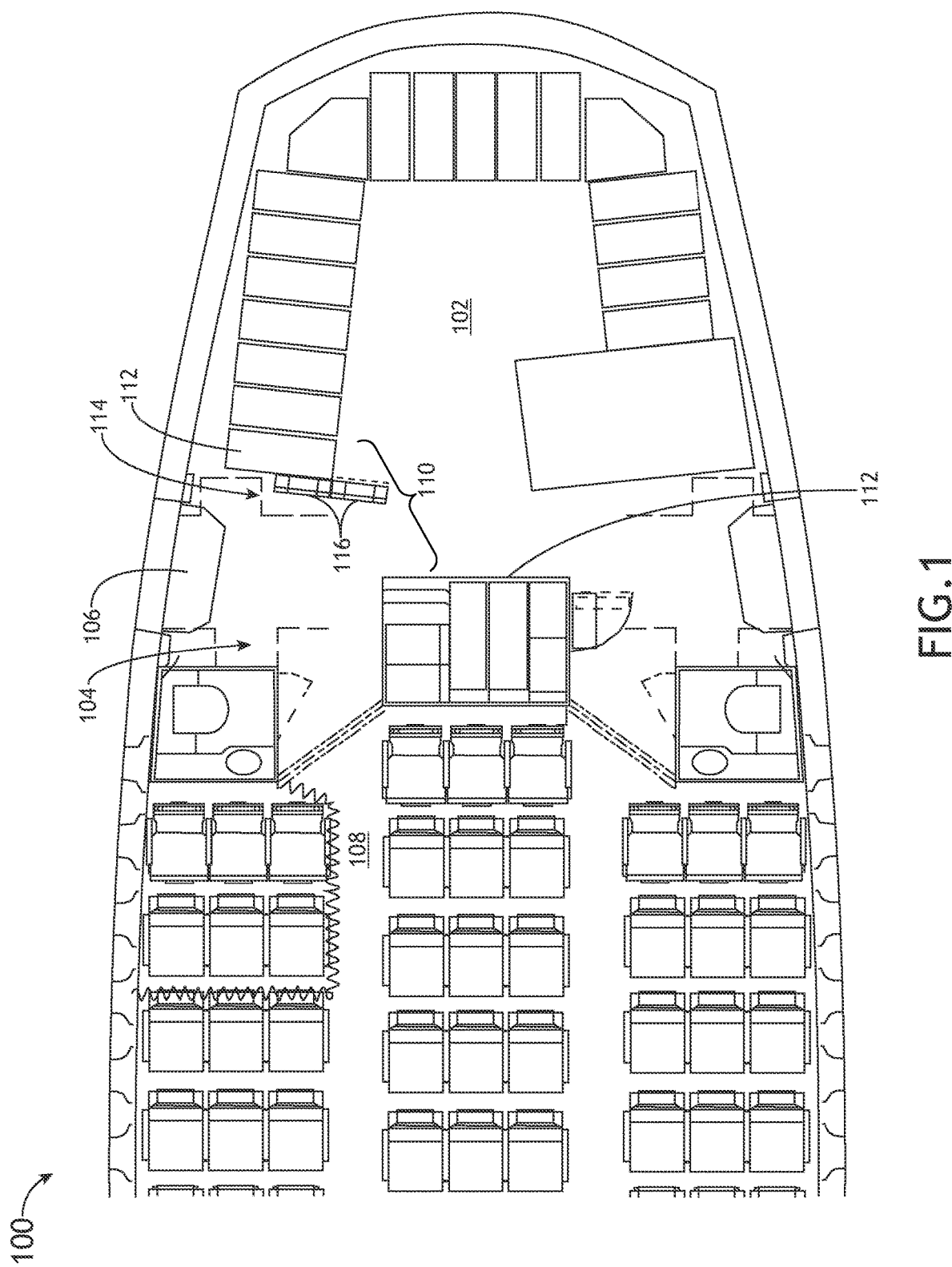
FIG. 1 illustrates a plan view of an aircraft cabin including a deployable cabin attendant seat system, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, wellknown features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-6 generally illustrate a deployable cabin attendant seat system, in accordance with one or more embodiments of the disclosure.

Aircraft cabin designs include cabin attendant seats for taxi, takeoff, or landing (TTL) situations, turbulence, emergencies, or the like, as aviation guidelines and/or standards dictate that flight attendants be seated at these times. However, the aircraft cabin designs need to address competing interests for increased passenger seating, storage space, lavatories, and/or galley spaces in addition to the need for the cabin attendant seats.

For example, arranging aircraft cabins may require minimizing an amount of room used for storage space, lavatories, galley spaces, and the cabin attendant seats to increase passenger seating. This minimizing may include modifying the arrangement and/or design of aircraft cabin areas or components in the aircraft cabin areas including, but not limited to, a galley, an aircraft lavatory, cabin attendant seating, or other structures and/or monuments of the aircraft passenger cabin.

FIG. 1 illustrates an aircraft cabin 100, in accordance with one or more embodiments of the disclosure. As illustrated in FIG. 1, select designs of the aircraft cabin 100 may condense storage space, lavatories, and galley structures into a galley 102. The aircraft cabin 100 may also include an egress area 104 proximate to a fuselage door 106. Accessing the galley 102 from an aisle 108 may require the passing through the egress area 104 and/or an opening 110 between aircraft interior structures or monuments 112.

The aircraft cabin 100 may include a cabin attendant seating system 114 with one or more cabin attendant seats 116. It is noted herein a "cabin attendant" may be considered any crew member (e.g., flight attendant, pilot, co-pilot, or the like) who may have access and/or need to use a cabin attendant seat (e.g., during a TTL-stage of flight, turbulence, emergencies, or the like). In addition, it is noted herein that "cabin attendant seat", "flight attendant seat", and "aircraft seat" may be considered interchangeable as used throughout the disclosure.

The one or more cabin attendant seats 116 may be used during a taxi, takeoff, or landing (TTL) stages of flight (though it is noted herein the one or more cabin attendant seats 116 are not limited to use during the select stages of flight as the TTL position, but also may be used at any point during the flight). Where the aircraft cabin 100 includes a double cabin attendant seating system 114 with a set of two cabin attendant seats 116, one or both of the cabin attendant seats 116 may restrict or otherwise interfere with passage through the egress area 104 and/or the opening 110 between aircraft interior structures or monuments 112 when the one or more cabin attendant seats 116 are deployed for use (e.g., during a TTL stage of flight, or the like).

Modification of the cabin attendant seating to allow for a more compact arrangement, however, may require load-bearing/weight-bearing requirements be met without losing the intended functionality of the attendant seating. For example, the attendant seating may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Embodiments of the present disclosure are directed to a deployable cabin attendant seat system. Embodiments of the present disclosure are also directed to the deployable cabin attendant seat system and its cabin attendant seats being configured to allow for increased passenger seats, storage space, lavatories, and/or galley spaces, while reducing the possibility of congestion in areas of the aircraft cabin while continuing to meet aviation guidelines and/or standards. For example, the deployable cabin attendant seat system and its cabin attendant seats should not interfere with egress areas and/or openings between aircraft interior structures or monuments when stowed during non-TTL stages of flight.

FIGS. 2A-6 generally illustrate a deployable cabin attendant seat system 114 within the aircraft cabin 100, in accordance with one or more embodiments of the disclosure.

The deployable cabin attendant seat system 114 may include two cabin attendant seats 116. The deployable cabin attendant seat system 114 with the two cabin attendant seats 116 may be positioned within the aircraft cabin 100 to not interfere with the fuselage door 106 including a door bustle (e.g., which may contain an escape slide), the aircraft interior structures or monuments 112, or other components installed within the aircraft cabin 100.

The two cabin attendant seats 116 may be stowable in a stacked configuration during a non-TTL stage of flight. For example, FIGS. 2A, 3A, 4A-4B, and 5A-5B illustrate the two cabin attendant seats 116 in a stacked configuration.

It is noted herein that a "stacked" configuration may refer to an instance where at least a portion of the two cabin attendant seats 116 overlaps along a width or wide surface of the two cabin attendant seats 116 as viewed from the front of the deployable cabin attendant seat system 114, while no portion of the two cabin attendant seats 116 overlaps along a thickness or narrow surface of the two cabin attendant seats 116 as viewed from the side of the deployable cabin attendant seat system 114. In addition, it is noted herein the overlap of the width or wide surface of the two "stacked" cabin attendant seats 116 may be fully aligned, or may be offset or staggered.

In addition, it is noted herein that a "stacked" configuration may refer an instance where the one cabin attendant seat 116 rests on the other cabin attendant seat 116, or where the one cabin attendant seat 116 is offset a select distance outward from the other cabin attendant seat 116.

The two cabin attendant seats 116 may be deployable in a side-by-side configuration during a TTL stage of flight. For example, FIGS. 2D, 3D, 4D-4E, and 5D-5E illustrate the two cabin attendant seats 116 in a side-by-side configuration.

It is noted herein that "side-by-side" may refer to an instance where at least a portion of the two cabin attendant seats 116 overlaps along a thickness or narrow surface of the two cabin attendant seats 116 as viewed from the side of the deployable cabin attendant seat system 114, while no portion of the two cabin attendant seats 116 overlaps along a width or wide surface of the two cabin attendant seats 116 as viewed from the front of the deployable cabin attendant seat system 114. In addition, it is noted herein the overlap of the thickness or narrow surface of the two "side-by-side" cabin attendant seats 116 may be fully aligned, or may be offset or staggered.

In addition, it is noted herein that a "side-by-side" configuration may refer an instance where the one cabin attendant seat 116 abuts against the other cabin attendant seat 116, or where the one cabin attendant seat 116 is offset a select distance away from the other cabin attendant seat 116.

At least one cabin attendant seat 116 may be deployable from a stowed seat position to a deployed seat position (and to a deployed seat pan position) for use during a TTL stage of flight. The deployable cabin attendant seat system 114 may be positioned within or proximate to the egress area 104. For example, the deployable cabin attendant seat system 114 may be positioned within the egress area 104 and proximate to the fuselage door 106. The deployable cabin attendant seat system 114 may be positioned within or proximate to the opening 110 between the egress area 104 and the galley 102 when the at least one cabin attendant seat 116 is in the deployed seat position.

At least one of the two cabin attendant seats 116 may be deployable between a stowed seat position and a deployed seat position through one or more intermediate seat positions for use during a TTL stage of flight. For example, FIGS. 2A-2C, 3A-3C, 4B-4D, and 5B-5D illustrate a transition of a cabin attendant seat 116 between a stowed seat position and a deployed seat position through one or more intermediate seat positions.

Figure 4A:
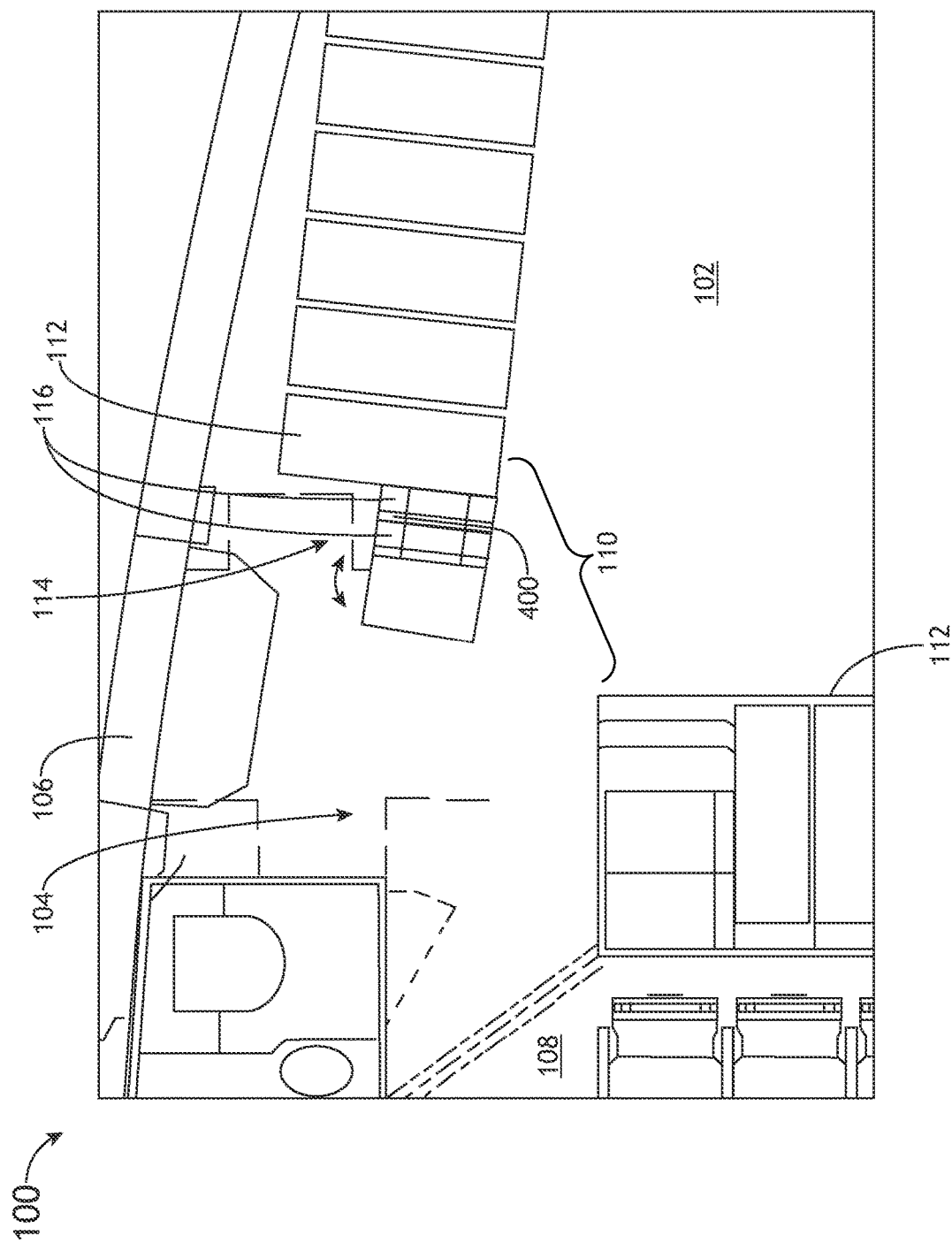
FIG. 4A illustrates a plan view of a portion of an aircraft cabin including a deployable cabin attendant seat system, in accordance with one or more embodiments of the disclosure.
Figure 4B:
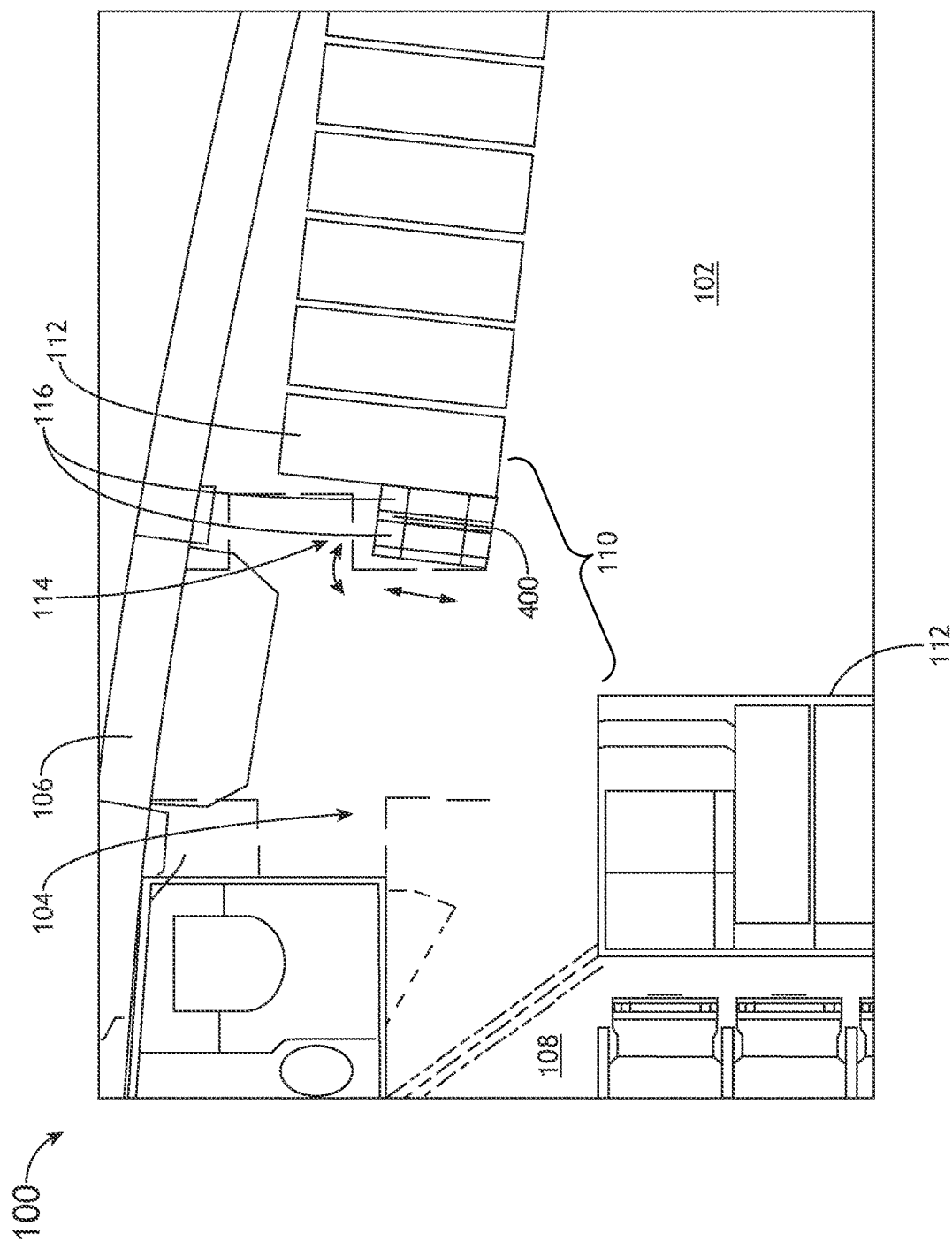
FIG. 4B illustrates a plan view of a portion of an aircraft cabin including a deployable cabin attendant seat system, in accordance with one or more embodiments of the disclosure.

The two cabin attendant seats 116 may be deployable between a stowed seat pan position and a deployed seat pan position for use during a TTL stage of flight. For example, FIGS. 2C-2D, 3C-3D, 4D-4E, and 5D-5E illustrate a transition between a stowed seat pan position and a deployed seat pan position for the two cabin attendant seats 116, when at least one cabin attendant seat 116 is in a deployed seat position. By way of another example, FIGS. 4A-4B illustrate a transition of a cabin attendant seat 116 between a stowed seat pan position and a deployed seat pan position, when at least one cabin attendant seat 116 is in a stowed seat position.

One or both of the cabin attendant seats 116 may be within the opening 110 when deployed for use during a TTL stage of flight. For example, as illustrated in FIGS. 2C-2D and 4C-4E, a cabin attendant seat 116 may be within the opening 110 when in an intermediate seat position, within the opening 110 when in a deployed seat position, and/or within the opening 110 when in a deployed seat pan position.

Figure 4C:
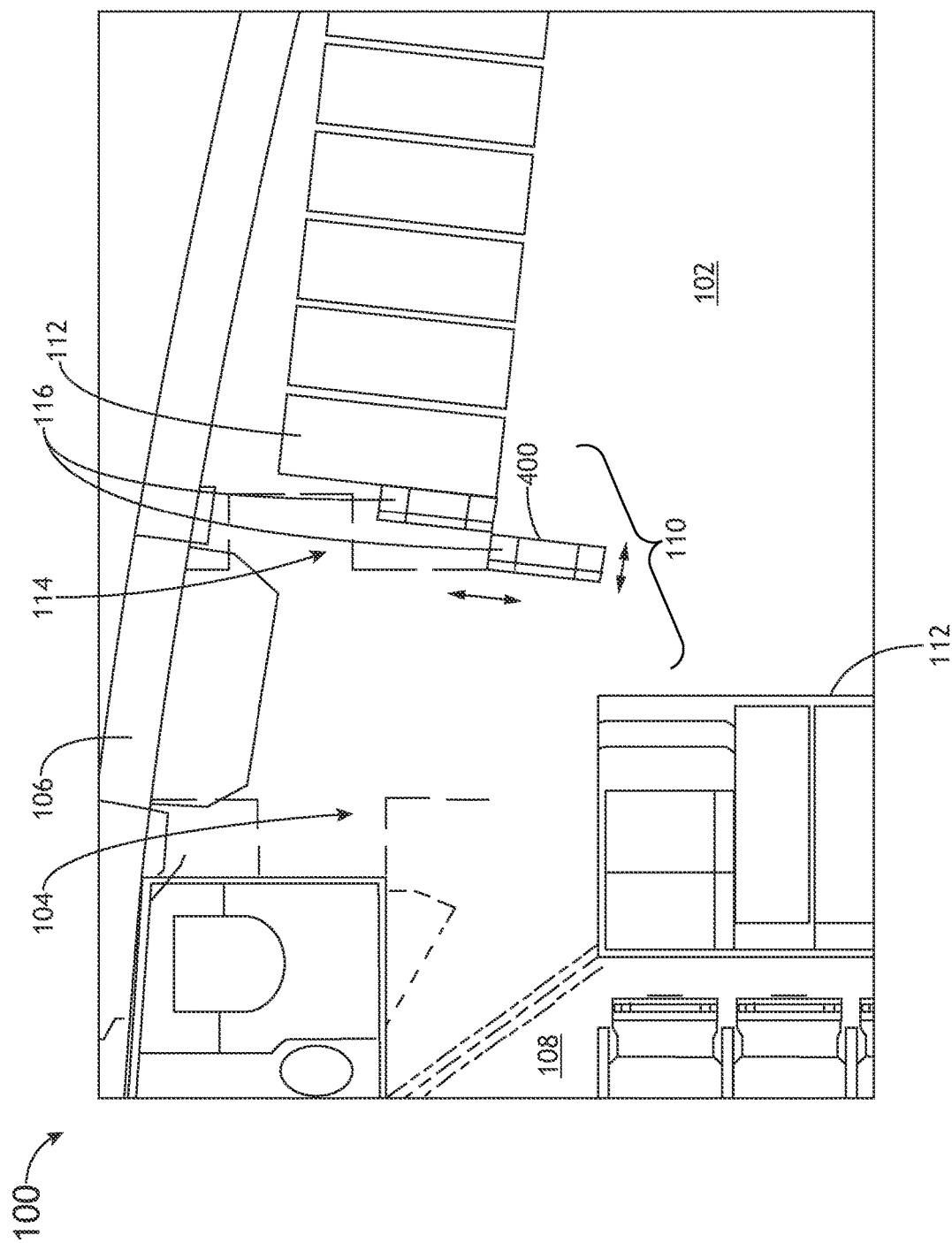
FIG. 4C illustrates a plan view of a portion of an aircraft cabin including a deployable cabin attendant seat system, in accordance with one or more embodiments of the disclosure.
Figure 4D:
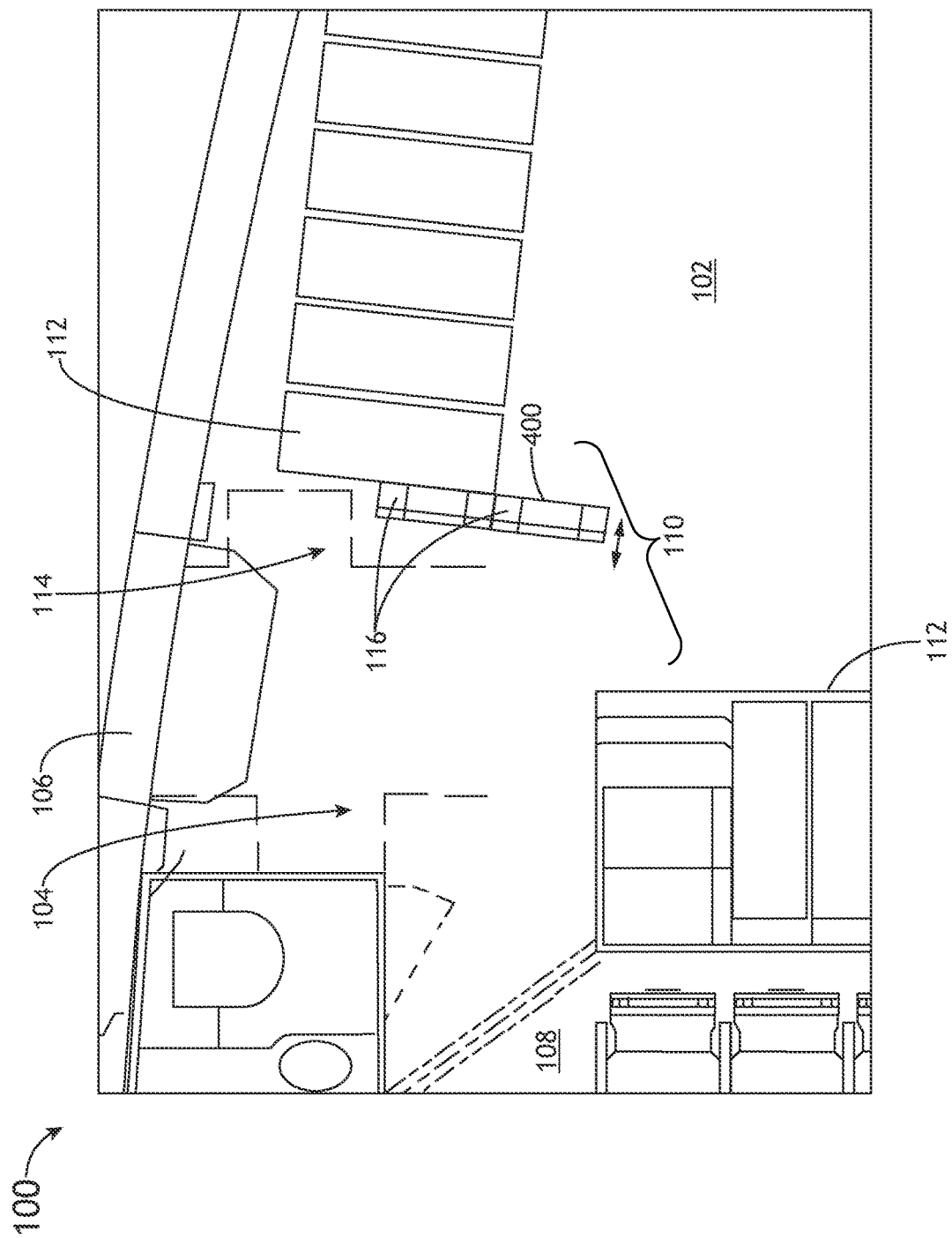
FIG. 4D illustrates a plan view of a portion of an aircraft cabin including a deployable cabin attendant seat system, in accordance with one or more embodiments of the disclosure.
Figure 4E:
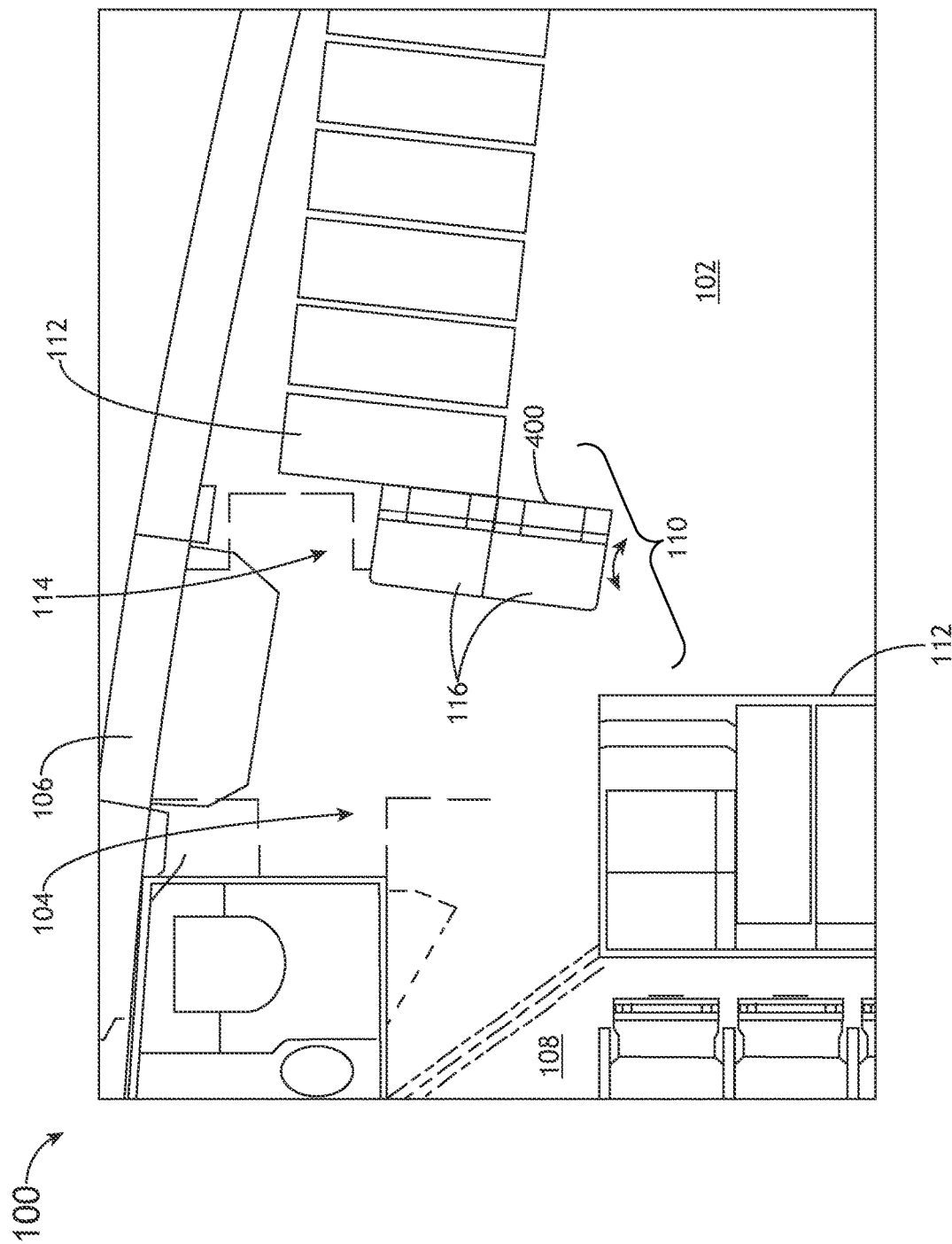
FIG. 4E illustrates a plan view of a portion of an aircraft cabin including a deployable cabin attendant seat system, in accordance with one or more embodiments of the disclosure.

The two cabin attendant seats 116 may be accessible from the egress area 104 for use during a TTL stage of flight. For example, as illustrated in FIGS. 2D and 4E, the two cabin attendant seats 116 may be usable by cabin attendants when the cabin attendant seats 116 are fully deployed (e.g., in a deployed seat position and in a deployed seat pan position). By way of another example, as illustrated in FIG. 4A, at least one cabin attendant seat 116 may be usable by a cabin attendant when the cabin attendant seats 116 is in a deployed seat pan position but still in a stowed seat position.

The deployable cabin attendant seat system 114 may increase to approximately twice its width when the cabin attendant seats 116 in the side-by-side configuration as compared to a width when the cabin attendant seats 116 are in the stowed and stacked position. It is noted herein, however, the deployable cabin attendant seat system 114 is not limited to increasing to approximately twice its width, but may increase any amount depending on the arrangement of the cabin attendant seats 116 when in the deployed seat position.

The deployable cabin attendant seat system 114 may be coupled to a floor in the aircraft cabin 100 proximate to an aircraft interior structure or monument 112. For example, the deployable cabin attendant seat system 114 may include a main support 300 which couples to the floor in the aircraft cabin 100 proximate to the aircraft interior structure or monument 112 and/or directly to the aircraft interior structure or monument 112.

The main support 300 may include a storage compartment 302. The one or more storage compartments 302 may include a door. It is noted herein, however, that the one or more storage compartments 302 may be similar to a shelving unit without doors. In addition, it is noted herein that the one or more storage compartments 302 may include one or more racks. The one or more storage compartments 302 may be accessible from the egress area 104 and/or from the opening 110.

A storage compartment 302 may be a storage compartment configured to receive cabin attendant items (e.g., cabin attendant carry-on luggage, or the like). A storage compartment 302 may include one or more safety devices (e.g., air masks, personal floatation devices, or the like).

A storage compartment 302 may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like.

A storage compartment 302 may include one or more electronic connections for one or more cabin attendant amenities such as, but not limited to, one or more charging ports, one or more charging cables, or the like. A storage compartment 302 may include one or more electronic connections in communication with one or more components of the aircraft cabin 100 such as, but not limited to, one or more display device connection ports, one or more display device connection cables, one or more audio output jacks (e.g., headphone jacks), one or more audio input jacks, or the like.

Although embodiments of the present disclosure illustrate the main support 300, it is noted herein the deployable cabin attendant seat system 114 may be coupled directly to an aircraft interior structure or monument 112, such that the main support 300 may not be required. Therefore, the above description should not be interpreted as a limitation on the present disclosure but merely an illustration.

Each cabin attendant seat 116 may include a frame or outer housing 304, a seat pan 306, a seatback 308, and a head rest 310. It is noted herein the seat pan 306, the seatback 308, and/or the head rest 310 may include one or more of a cushion, a diaphragm, a dress cover, or some combination of a cushion, a diaphragm, and a dress cover.

The seat pan 306 may be horizontal or may be set at an angle relative to the floor of the aircraft cabin 100 when a cabin attendant seat 116 is in a deployed seat position. The seat pan 306 may include one or multiple sections. For example, the one or multiple sections may be configured to allow for increased collapsibility of the cabin attendant seat 116 when in the stowed seat position and/or configured to conform to a cabin attendant when seated in the cabin attendant seat 116.

The seatback 308 may be vertical or may be set at an angle relative to the floor of the aircraft cabin 100 when a cabin attendant seat 116 is in a deployed seat position. The seatback 308 may include one or multiple sections. For example, the one or multiple sections may be configured to allow for increased collapsibility of the cabin attendant seat 116 when in the stowed seat position and/or configured to conform to a cabin attendant when seated in the cabin attendant seat 116.

The head rest 310 may be dimensioned to include a phone cradle 312 configured to receive a handset connected with systems in the aircraft cabin 100 including, but not limited to, cockpit communication systems, public address or announcement (PA) communication systems within the aircraft cabin 100, or the like. The head rest 310 may include a rest surface that is any shape known in the art. For example, the rest surface of the head rest 310 may be rectangular (or substantially rectangular). For instance, the rectangular (or substantially rectangular) head rest 310 may include the phone cradle 312. By way of another example, the rest surface of the head rest 310 may be tapered (e.g., trapezoidal or triangular (or substantially triangular)). It is noted herein the deployable cabin attendant seat system 114 may include cabin attendant seats 116 with the same or different style of head rests 310.

The deployable cabin attendant seat system 114 may include one or more actuation assemblies.

The deployable cabin attendant seat system 114 may include an actuation assembly configured to actuate at least one cabin attendant seat 116 from a stowed seat position or a deployed seat position. For example, the actuation assembly may actuate a first or primary cabin attendant seat 116 relative to a stationary (or non-actuating) second or auxiliary cabin attendant seat 116.

Figure 2A:
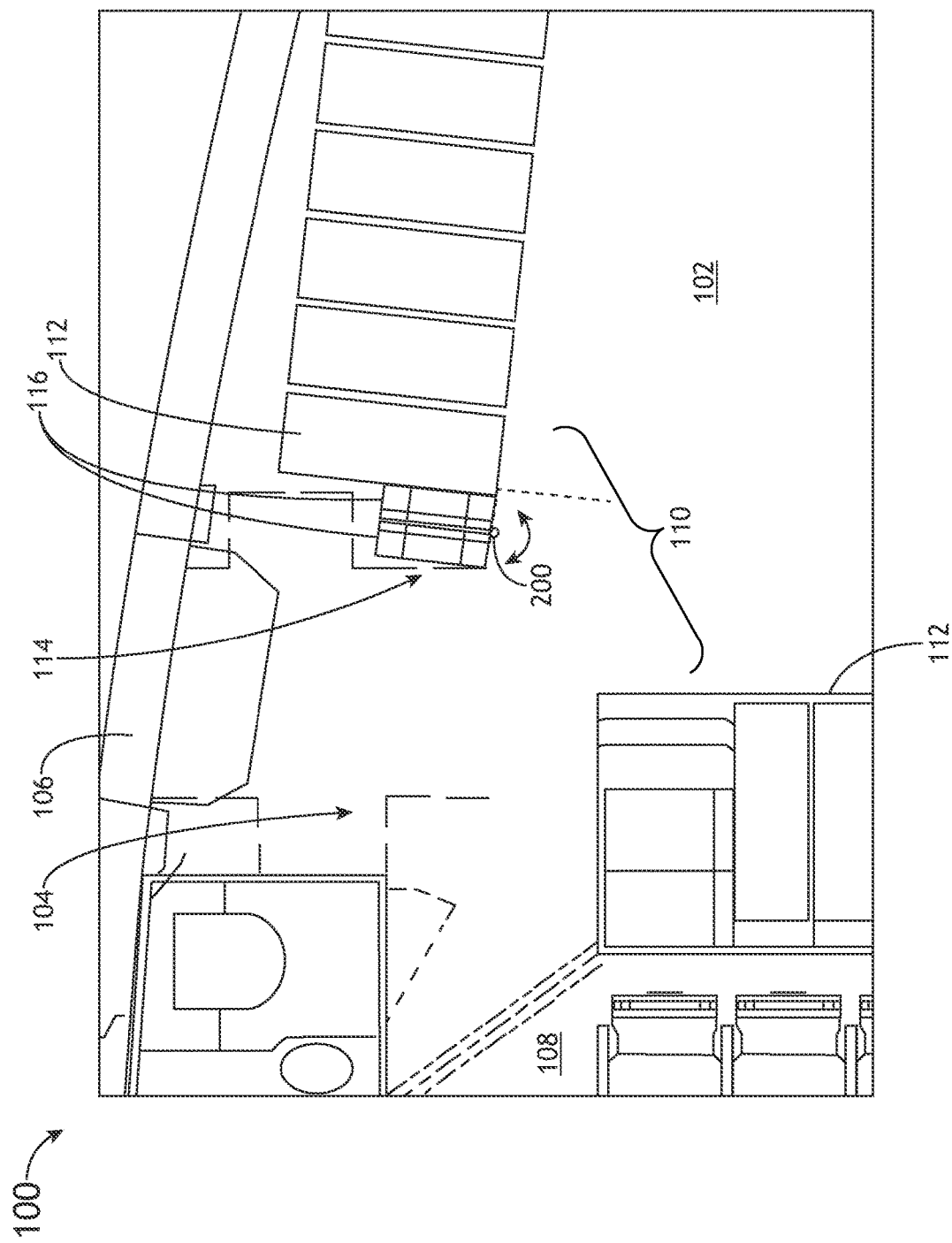
FIG. 2A illustrates a plan view of a portion of an aircraft cabin including a deployable cabin attendant seat system, in accordance with one or more embodiments of the disclosure.
Figure 2B:
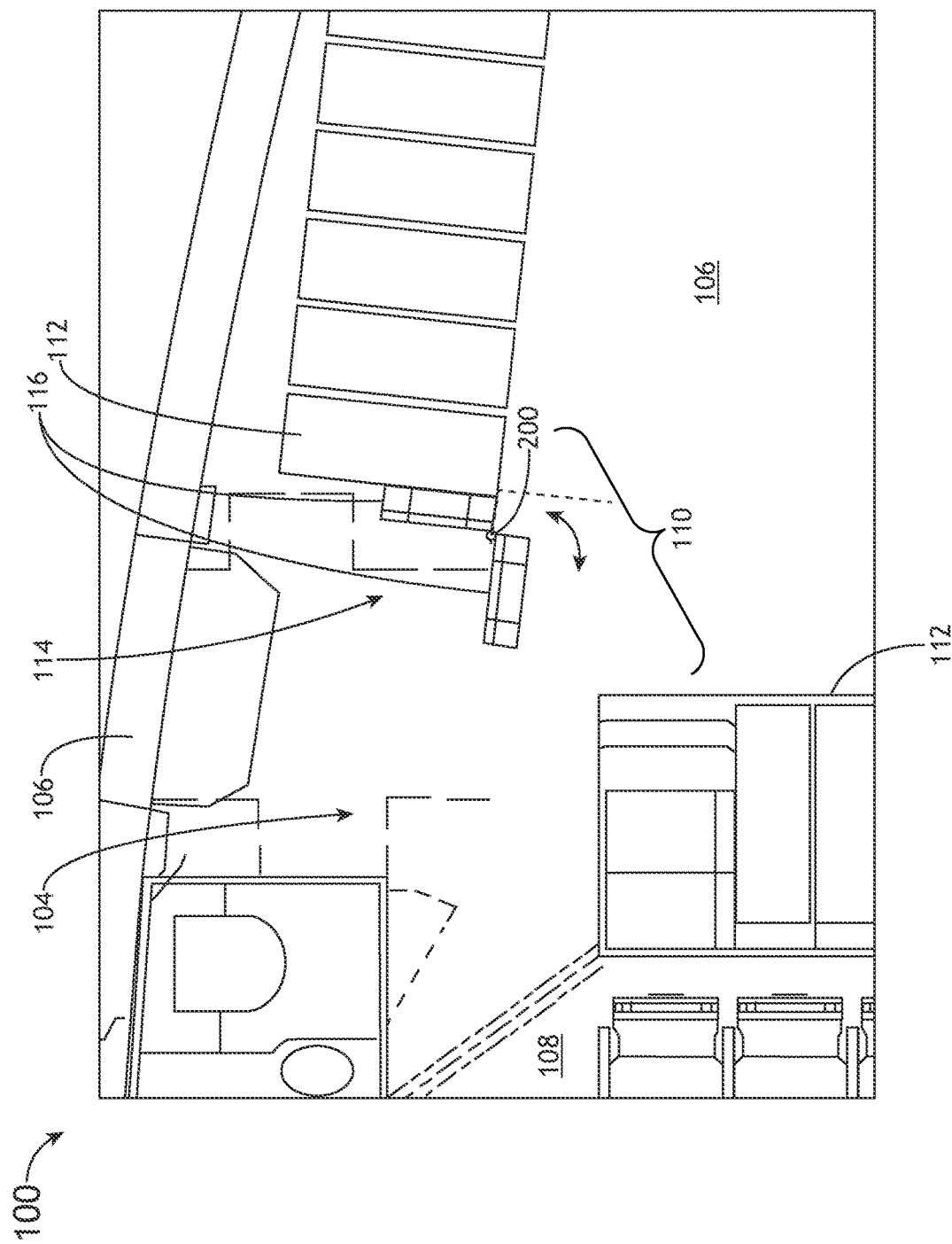
FIG. 2B illustrates a plan view of a portion of an aircraft cabin including a deployable cabin attendant seat system, in accordance with one or more embodiments of the disclosure.
Figure 2C:
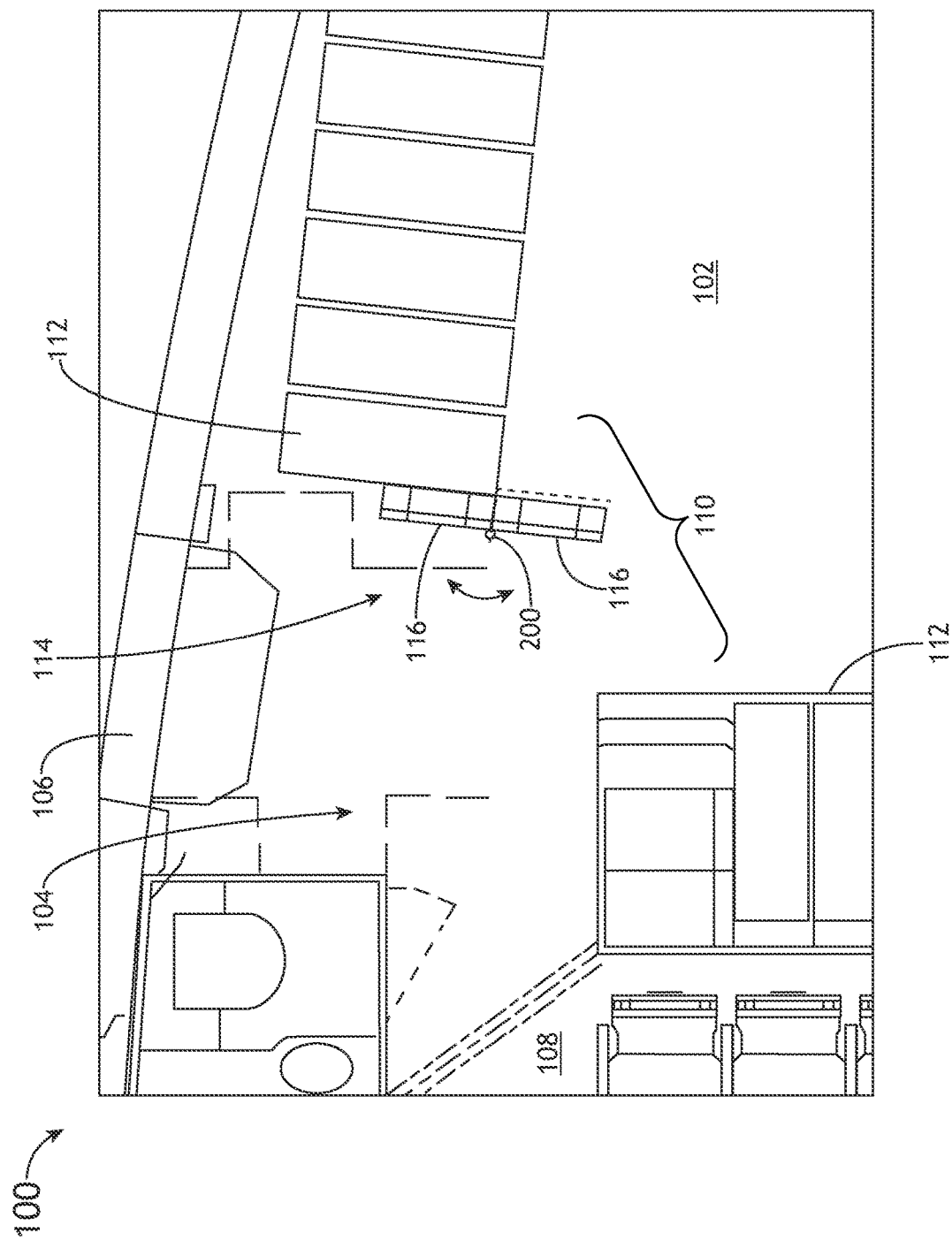
FIG. 2C illustrates a plan view of a portion of an aircraft cabin including a deployable cabin attendant seat system, in accordance with one or more embodiments of the disclosure.
Figure 2D:
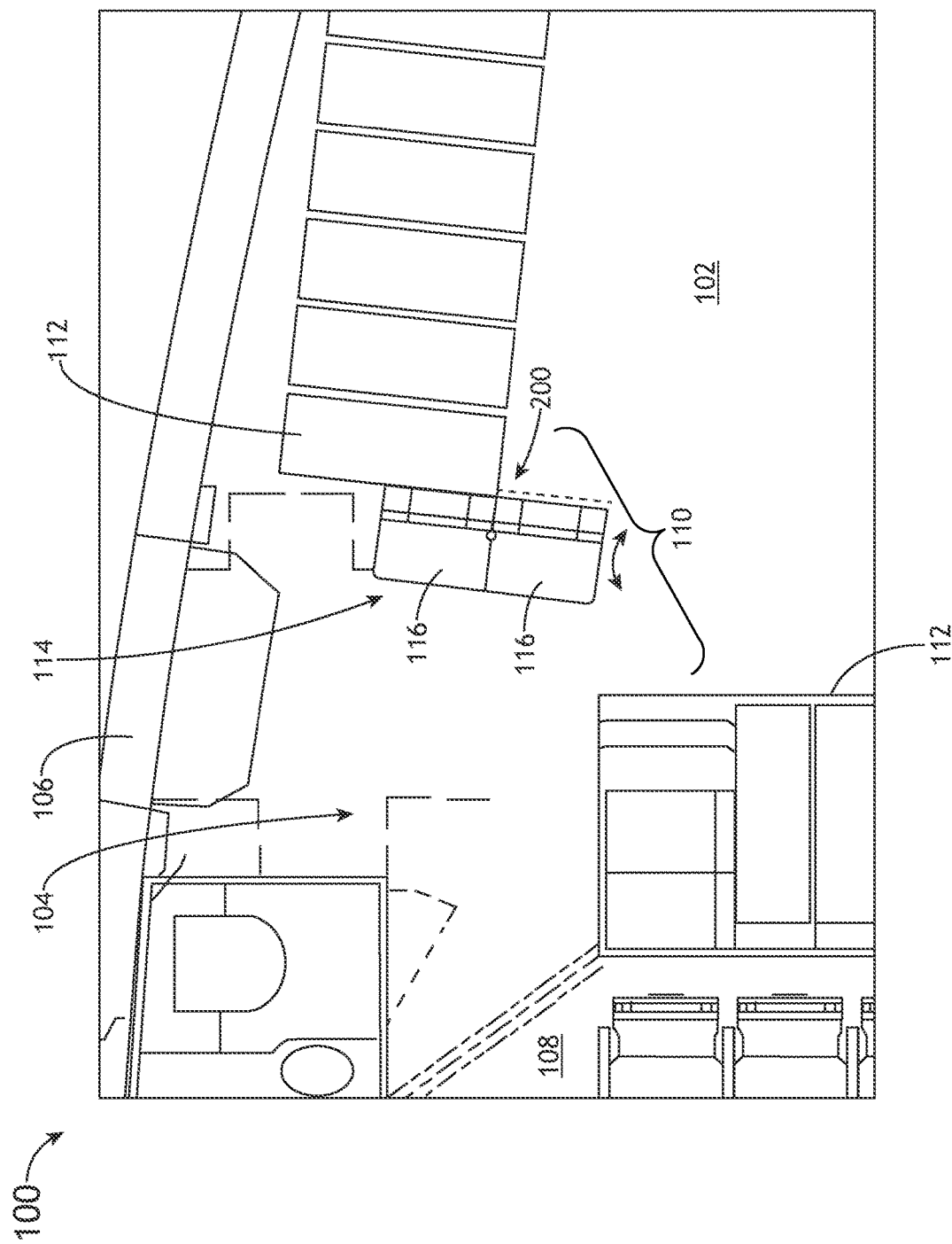
FIG. 2D illustrates a plan view of a portion of an aircraft cabin including a deployable cabin attendant seat system, in accordance with one or more embodiments of the disclosure.
Figure 3A:
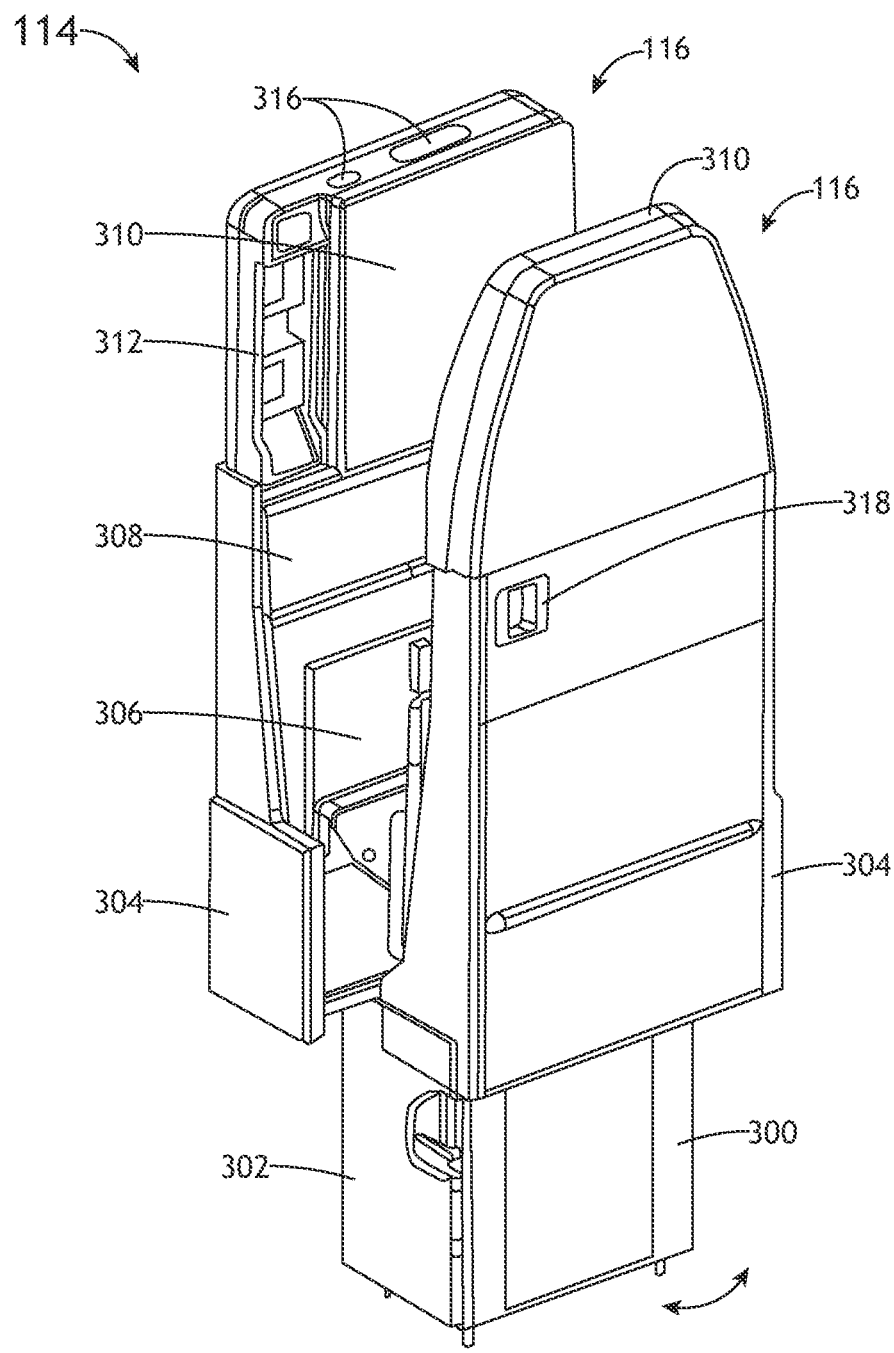
FIG. 3A illustrates a perspective view of a deployable cabin attendant seat system, in accordance with one or more embodiments of the disclosure.
Figure 3B:
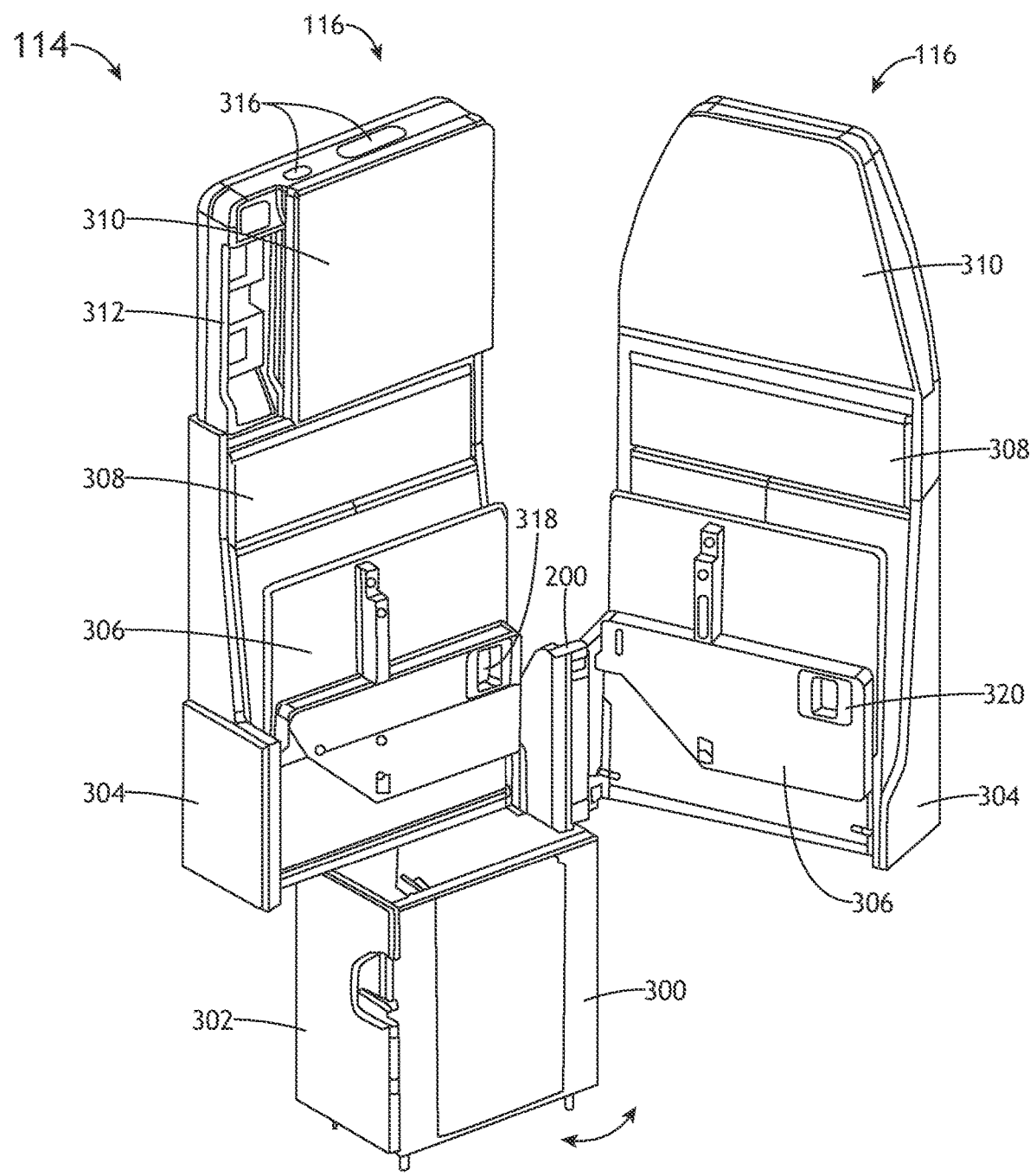
FIG. 3B illustrates a perspective view of a deployable cabin attendant seat system, in accordance with one or more embodiments of the disclosure.
Figure 3C:
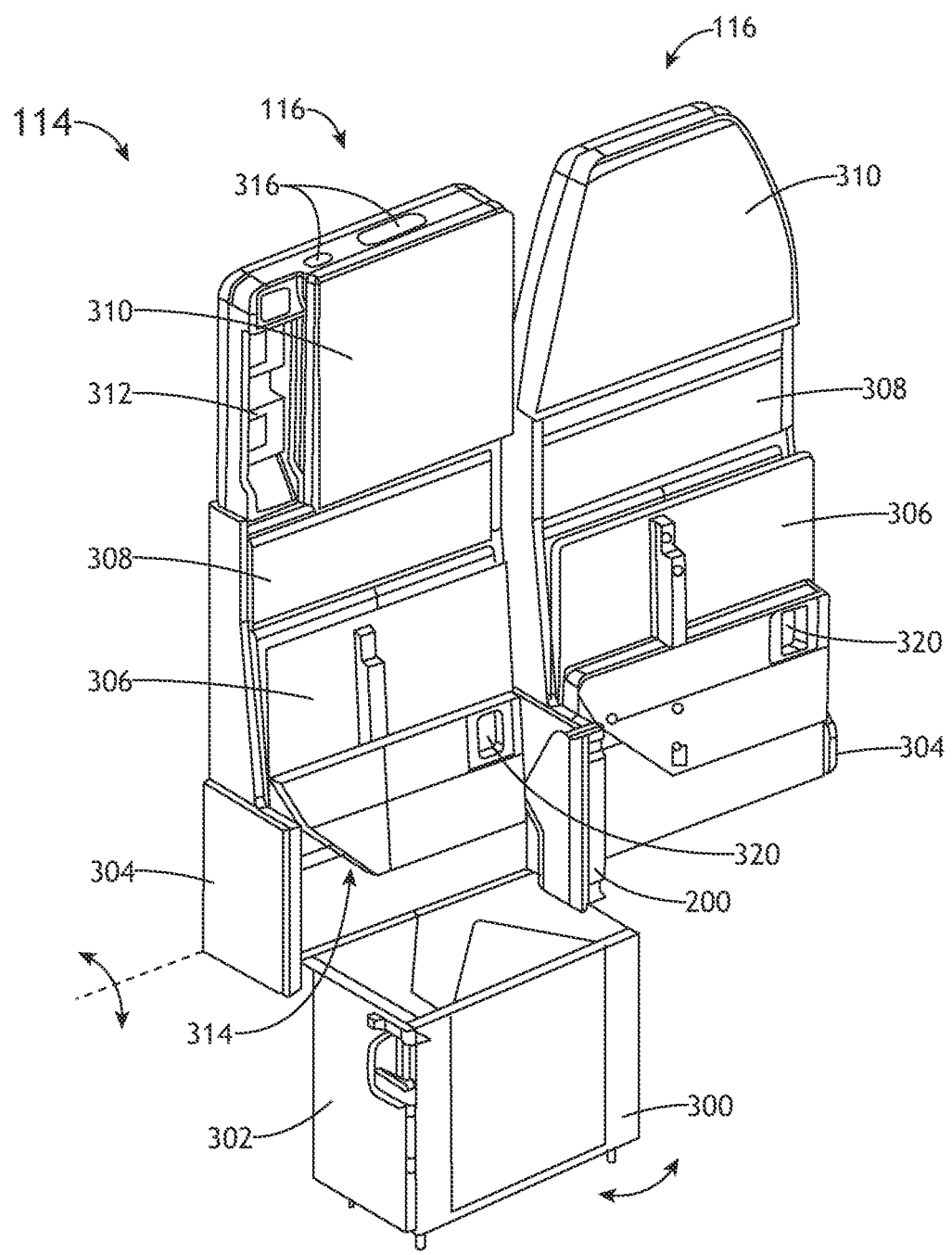
FIG. 3C illustrates a perspective view of a deployable cabin attendant seat system, in accordance with one or more embodiments of the disclosure.
Figure 3D:
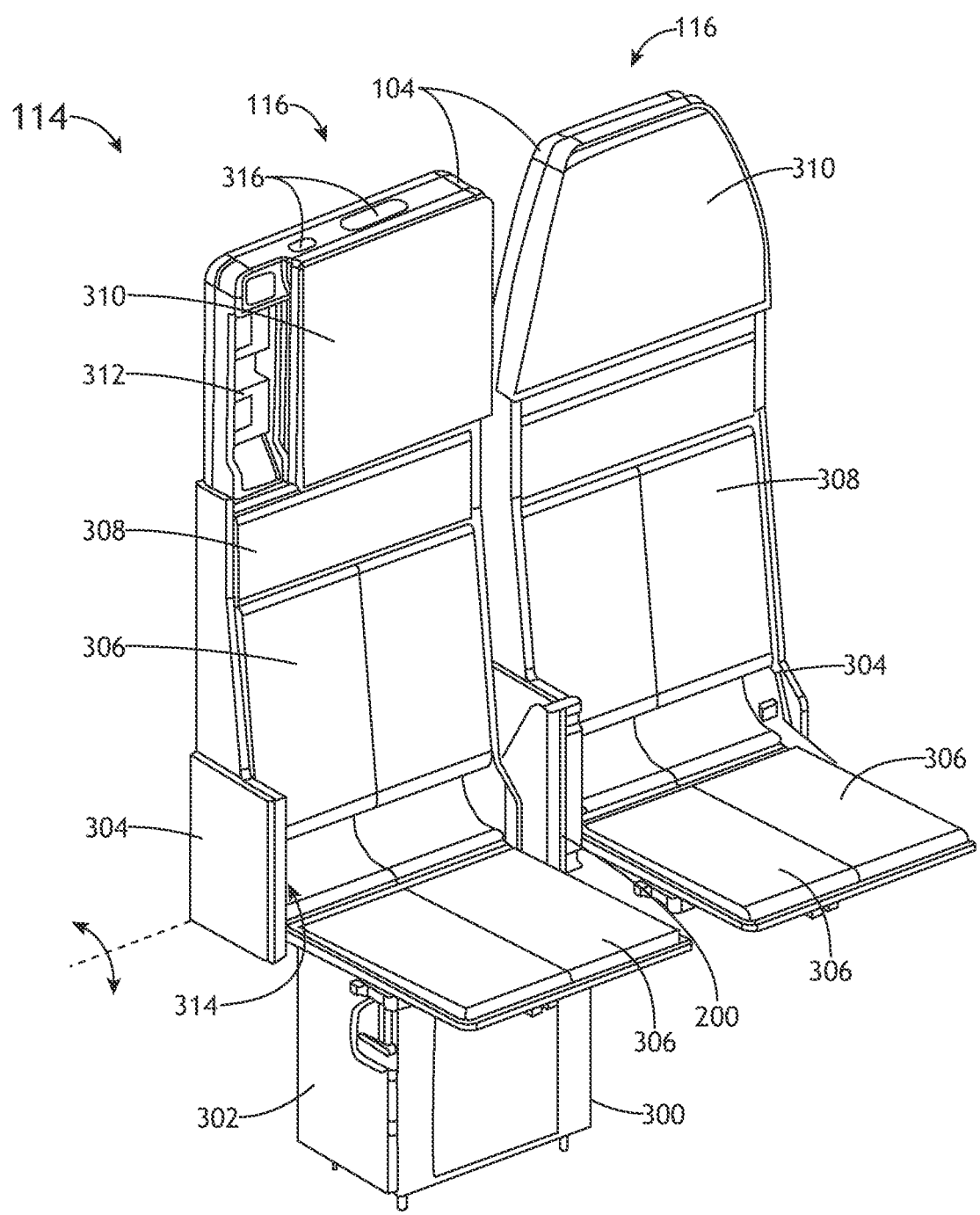
FIG. 3D illustrates a perspective view of a deployable cabin attendant seat system, in accordance with one or more embodiments of the disclosure.

In one non-limiting example as illustrated in FIGS. 2A-3D, at least one of the cabin attendant seats 116 may be deployed via actuation assemblies such as one or more hinge assemblies 200. The one or more hinge assemblies 200 may be coupled to the main support 300 and/or may be coupled to the frame or outer housing 304 of each cabin attendant seat 116. The one or more hinge assemblies 200 may be configured to cause a cabin attendant seat 116 to actuate between a stowed seat position (e.g., as illustrated in FIGS. 2A and 3A) and a deployed seat position (e.g., as illustrated in FIGS. 2C and 3C) through one or more intermediate seat positions (e.g., as illustrated in FIGS. 2B and 3B).

For example, the one or more hinge assemblies 200 may be configured to cause a cabin attendant seat 116 to rotate about one or more axes and/or translate along one or more axes between the stowed seat position and the deployed seat position through the one or more intermediate seat positions. For instance, the one or more hinge assemblies 200 may be configured to cause a cabin attendant seat 116 to rotate about one or more axes from 0 degrees (e.g., as defined from the stowed position) to an angle ranging from between 90 degrees and 270 degrees, and preferably to an angle ranging from between 135 degrees and 225 degrees of travel, and more preferably to an angle of or approximately 180 degrees.

Where the rotation is a single-direction rotation about one or more axes, the actuating cabin attendant seat 116 may face toward the stationary (or non-actuating) cabin attendant seat 116 when the actuating cabin attendant seat 116 is in a stowed seat position, and may face away from as the stationary cabin attendant seat 116 when the actuating cabin attendant seat 116 is in a deployed seat position. In one non-limiting example, the actuating cabin attendant seat 116 may face rearward when the actuating cabin attendant seat 116 is in a stowed seat position and may face forward when the actuating cabin attendant seat 116 is in a deployed seat position, while the stationary cabin attendant seat 116 faces forward.

Where the rotation includes rotation in multiple directions about multiple axes, the actuating cabin attendant seat 116 may face away from the stationary cabin attendant seat 116 when the actuating cabin attendant seat 116 is in a stowed seat position and in a deployed seat position.

By way of another example, the one or more hinge assemblies 200 may be configured to cause a cabin attendant seat 116 to translate between the stowed seat position and the deployed seat position through the one or more intermediate seat positions prior to and/or following rotation between the stowed seat position and the deployed seat position through the one or more intermediate seat positions. For instance, where the actuating cabin attendant seat 116 faces toward the stationary cabin attendant seat 116 when the actuating cabin attendant seat 116 is in the stowed seat position, the actuating cabin attendant seat 116 may translate outward to allow for the actuating cabin attendant seat 116 to reorient from facing toward the stationary cabin attendant seat 116 to facing away from the stationary cabin attendant seat 116. It is noted herein the translation may occur prior to the rotation about the one or more axes to the deployed seat position, after the rotation about the one or more axes to the deployed seat position, and/or independently of the rotation about the one or more axes to the deployed seat position (e.g., to allow for the actuating cabin attendant seat 116 to be used by a cabin attendant with the actuating cabin attendant seat 116 in the deployed seat pan position and in the stowed seat position).

By way of another example, the one or more hinge assemblies 200 may be configured to cause a cabin attendant seat 116 to simultaneously rotate and translate for at least one stage of the transition between the stowed seat position and the deployed seat position through the one or more intermediate seat positions. It is noted herein the rotation and the translation may be tied together (e.g., by a cam follower or other linkage) for a smooth, single-stage transition between the deployed position and the stowed position instead of a multi-stage transition.

In another non-limiting example as illustrated in FIGS. 4A-5E, at least one of the cabin attendant seats 116 may be deployed via actuation assemblies such as one or more linkage assemblies 400. For example, the one or more linkage assemblies 400 may include, but is not limited to, a four-bar linkage assembly.

Figure 5A:
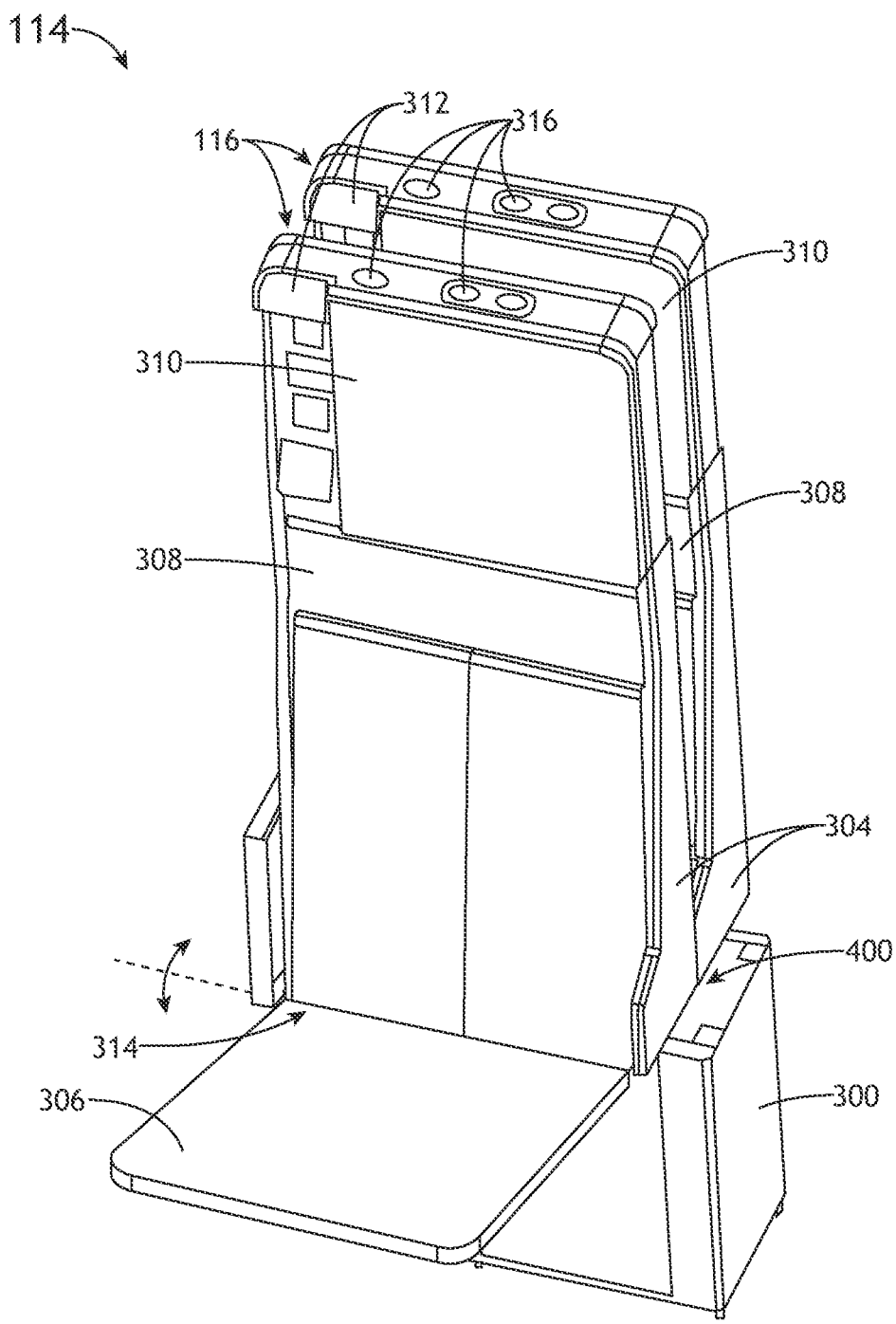
FIG. 5A illustrates a perspective view of a deployable cabin attendant seat system, in accordance with one or more embodiments of the disclosure.
Figure 5B:
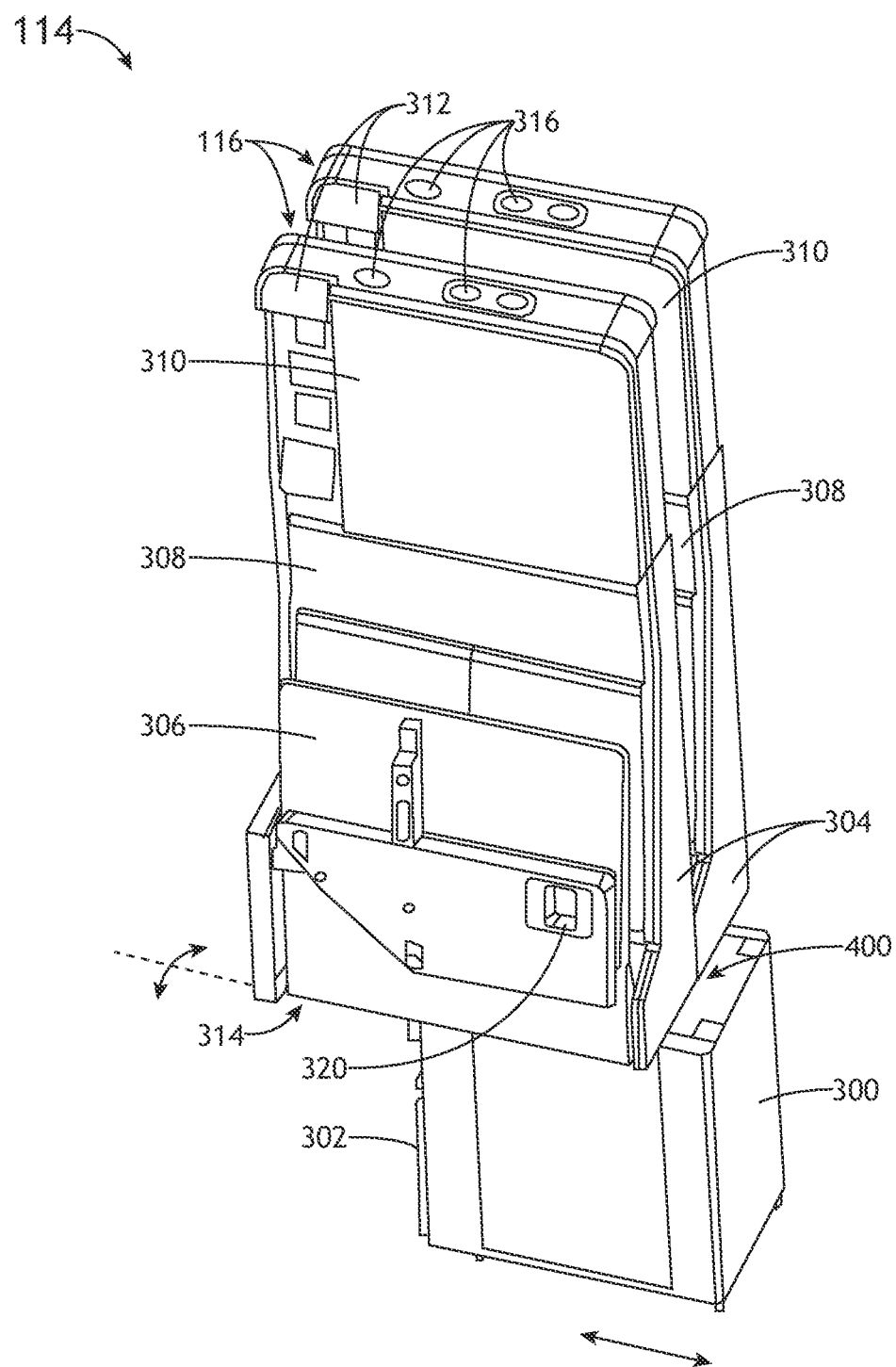
FIG. 5B illustrates a perspective view of a deployable cabin attendant seat system, in accordance with one or more embodiments of the disclosure.
Figure 5C:
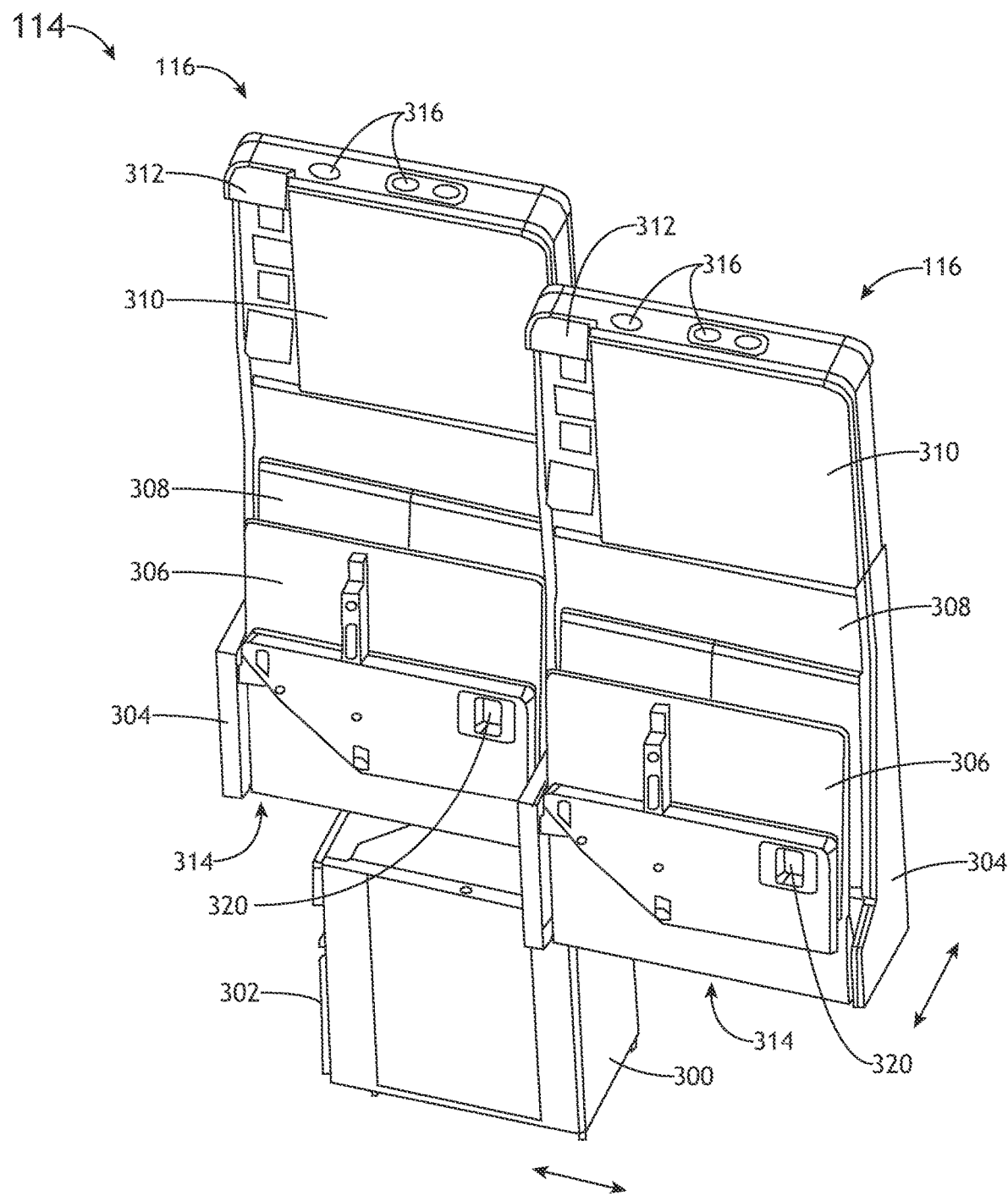
FIG. 5C illustrates a perspective view of a deployable cabin attendant seat system, in accordance with one or more embodiments of the disclosure.
Figure 5D:
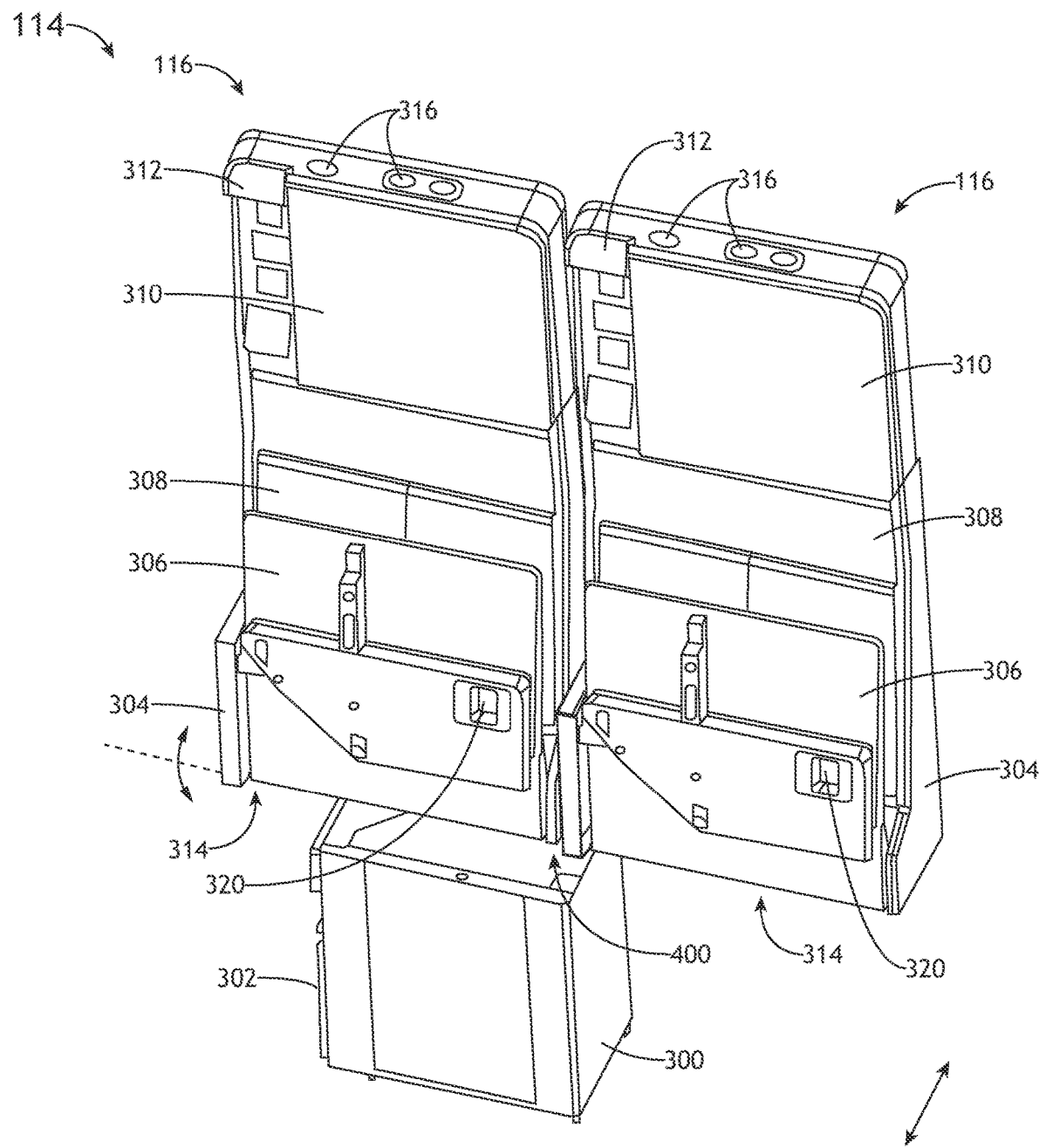
FIG. 5D illustrates a perspective view of a deployable cabin attendant seat system, in accordance with one or more embodiments of the disclosure.
Figure 5E:
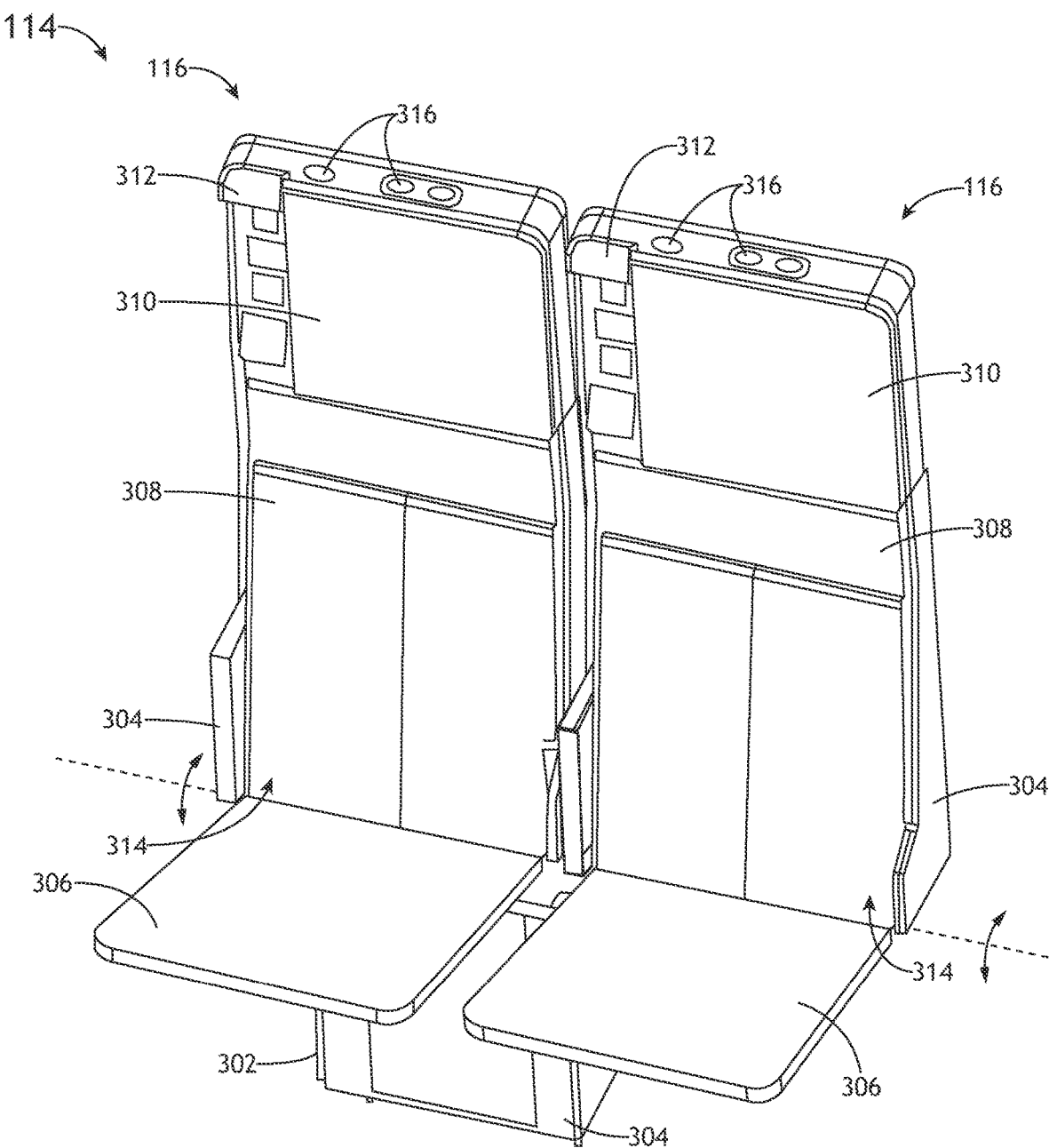
FIG. 5E illustrates a perspective view of a deployable cabin attendant seat system, in accordance with one or more embodiments of the disclosure.

The one or more linkage assemblies 400 may be coupled to the main support 300 and/or may be coupled to the frame or outer housing 304 of each cabin attendant seat 116. The one or more linkage assemblies 400 may be configured to cause a cabin attendant seat 116 to actuate between a stowed seat position (e.g., as illustrated in FIGS. 4B and 5B) and a deployed seat position (e.g., as illustrated in FIGS. 4D and 5D) through one or more intermediate seat positions (e.g., as illustrated in FIGS. 4C and 5C).

For example, the one or more linkage assemblies 400 may be configured to cause a cabin attendant seat 116 to translate along one or more axes and/or rotate about one or more axes between the stowed seat position and the deployed seat position through the one or more intermediate seat positions.

For instance, the one or more linkage assemblies 400 may be configured to cause a cabin attendant seat 116 to translate in a first direction along a first set of one or more axes between the stowed seat position and an intermediate seat position. In addition, the one or more linkage assemblies 400 may be configured to cause a cabin attendant seat 116 to translate in a second direction along a second set of one or more axes between the intermediate seat position and the deployed seat position. It is noted herein the first set of one or more axes and the second set of one or more axes may be parallel (or substantially parallel), perpendicular (or substantially perpendicular) or set at an angle. In addition, it is noted herein the first direction and the second direction may be a same or similar direction, or different directions.

The actuating cabin attendant seat 116 may face in away from the stationary cabin attendant seat 116 when the actuating cabin attendant seat 116 is in a stowed seat position and is in a deployed seat position. In one non-limiting example, the actuating cabin attendant seat 116 may face forward when the actuating cabin attendant seat 116 is in either a stowed seat position or a deployed seat position, while the stationary cabin attendant seat 116 faces forward.

It is noted herein, however, the actuating cabin attendant seat 116 may face toward the stationary cabin attendant seat 116 when the actuating cabin attendant seat 116 is in a stowed seat position, and away from the stationary cabin attendant seat 116 when the actuating cabin attendant seat 116 is in a deployed seat position. In one non-limiting example, the actuating cabin attendant seat 116 may face rearward when the actuating cabin attendant seat 116 is in a stowed seat position and may face forward when the actuating cabin attendant seat 116 is in a deployed seat position, while the stationary cabin attendant seat 116 faces forward.

By way of another example, the one or more linkage assemblies 400 may be configured to cause a cabin attendant seat 116 to rotate between the stowed seat position and the deployed seat position through the one or more intermediate seat positions prior to and/or following translation between the stowed seat position and the deployed seat position through the one or more intermediate seat positions. For instance, where the actuating cabin attendant seat 116 faces toward the stationary cabin attendant seat 116 when the actuating cabin attendant seat 116 is in the stowed seat position, the actuating cabin attendant seat 116 may rotate to allow for the actuating cabin attendant seat 116 to reorient from facing toward the stationary cabin attendant seat 116 to facing away from the stationary cabin attendant seat 116. It is noted herein the rotation may occur prior to the translation along the first set of one or more axes and/or the second set of one or more axes to the deployed seat position, after the translation along the first set of one or more axes and/or the second set of one or more axes to the deployed seat position, and/or independently of the translation along the first set of one or more axes and/or the second set of one or more axes to the deployed seat position (e.g., to allow for the actuating cabin attendant seat 116 to be used by a cabin attendant with the actuating cabin attendant seat 116 in the deployed seat pan position and in the stowed seat position).

By way of another example, the one or more linkage assemblies 400 may be configured to cause a cabin attendant seat 116 to simultaneously translate and rotate for at least a portion of the transition between the stowed seat position and the deployed seat position through the one or more intermediate seat positions. For instance, the one or more linkage assemblies 400 may include one or more tracks along with the actuating cabin attendant seat 116 may travel during transition between the stowed seat position and the deployed seat position, where the one or more tracks may effect a translation and/or a rotation at different stages of the transition. It is noted herein the rotation and the translation may be tied together (e.g., by a cam follower or other linkage) for a smooth, single-stage transition between the deployed position and the stowed position instead of a multi-stage transition.

It is noted herein at least one of the one or more hinge assemblies 200 and/or the one or more linkage assemblies 400 may be spring-loaded, such that the actuating cabin attendant seat 116 returns to and/or is held in the stowed seat position absent a force being exerted on the actuating cabin attendant seat 116 to keep the actuating cabin attendant seat 116 to remain in the deployed seat position (e.g., for use by a cabin attendant).

The deployable cabin attendant seat system 114 may include an actuation assembly such as one or more hinge assemblies 314 configured to actuate the seat pan 306 from a stowed seat pan position to a deployed seat pan position. The one or more hinge assemblies 314 may be configured to cause a seat pan 306 to actuate between a deployed seat pan position (e.g., as illustrated in FIGS. 2D, 3D, 4A, 4E, 5A, and 5E) and a stowed seat pan position (e.g., as illustrated in FIGS. 2A-2C, 3A-3C, 4B-4D, and 5B-5D).

For example, the one or more hinge assemblies 314 may be configured to cause a seat pan 306 to rotate about one or more axes and/or translate along one or more axes between the stowed seat pan position and the deployed seat pan position.

The rotation is a single-direction rotation about one or more axes, such that the seat pan 306 may face toward the seatback 308 when the seat pan 306 is in a stowed seat pan position.

The rotation may be a multi-direction rotation about multiple axes, such that the seat pan 306 may face away from the seatback 308 when the seat pan 306 is in a stowed seat pan position.

By way of another example, the one or more hinge assemblies 314 may be configured to cause a seat pan 306 to translate between the stowed seat pan position and the deployed seat pan position prior to and/or following rotation between the stowed seat pan position and the deployed seat pan position. For instance, where the seat pan 306 faces toward the seatback 308 when the seat pan 306 is in the stowed seat pan position, the seat pan 306 may translate outward to allow for the seat pan 306 to reorient from facing toward the seatback 308. It is noted herein the translation may occur prior to the rotation about the one or more axes to the deployed seat pan position, after the rotation about the one or more axes to the deployed seat pan position, and/or independently of the rotation about the one or more axes to the deployed seat pan position (e.g., to allow for the seat pan 306 to be used by a cabin attendant with the actuating cabin attendant seat 116 in the deployed seat pan position and in the stowed seat position).

By way of another example, the one or more hinge assemblies 314 may be configured to cause a seat pan 306 to simultaneously rotate and translate for at least one stage of the transition between the stowed seat pan position and the deployed seat pan position.

Although embodiments of the present disclosure illustrate the one or more actuation assemblies including one or more hinge assemblies 200 and/or linkage assemblies 400, it is noted herein the one or more actuation assemblies may include one or more rails, tracks, sliders, or other components configured to translate the one or more cabin attendant seats 116; one or more hinges or other components configured to rotate or pivot the one or more cabin attendant seats 116; a combination of components to both translate and rotate or pivot the one or more cabin attendant seats 116. In general, the one or more actuation assemblies may include any mechanism or device configured to meet aviation guidelines and/or standards. It is noted herein that where there are multiple cabin attendant seats 116, the multiple cabin attendant seats 116 may be actuated as a single unit or independently.

Referring again in general to FIGS. 2A-5E, the deployable cabin attendant seat system 114 may include one or more interlocking assemblies 316. The one or more interlocking assemblies 316 may be configured to allow the actuating cabin attendant seat 116 to actuate between the stowed seat position and the deployed seat position. The one or more interlocking assemblies 316 may be configured to hold or secure the actuating cabin attendant seat 116 in the stowed seat position and/or the deployed seat position. For example, the one or more interlocking assemblies 316 may be a mechanical or magnetic detent mechanism or other mechanism that holds or secures the actuating cabin attendant seat 116 in the stowed seat position and/or the deployed seat position. For instance, the one or more interlocking assemblies 316 may be self-latching/self-releasing, may be latched/released when a force is directly applied to the actuating cabin attendant seat 116 by the cabin attendant, and/or may be latched/released through an external component (e.g., a switch, toggle, button, or the like) or assembly acted upon by the cabin attendant. It is noted herein the one or more interlocking assemblies 316 may be require to hold or secure the actuating cabin attendant seat 116 in the deployed seat position to withstand crash and gust/flight loads.

The deployable cabin attendant seat system 114 may include one or more handles 318 configured to provide a cabin attendant with a hold or secure point when actuating the cabin attendant seat 116 between the stowed seat position and the deployed seat position. The one or more handles 318 may be installed in or integrated with the frame or outer housing 304, the seat pan 306, the seatback 308, and/or the head rest 310.

The one or more handles 318 may be separate from the one or more interlocking assemblies 316. It is noted herein, however, the one or more handles 318 may be at least partially integrated with the one or more interlocking assemblies 316. For example, the one or more interlocking assemblies 316 may include a depressible button which may create a cavity configured to operate as a handle 318 and receive a portion of a hand of a cabin attendant in the actuating cabin attendant seat 116 when depressed, a lever configured to operate as a handle 318 to which a cabin attendant may hold or secure when engaging with the one or more interlocking assemblies 316, or the like.

The deployable cabin attendant seat system 114 may include one or more handles 320 configured to provide a cabin attendant with a hold or secure point when actuating the seat pan 306 between the stowed seat pan position and the deployed seat pan position.

Figure 6:
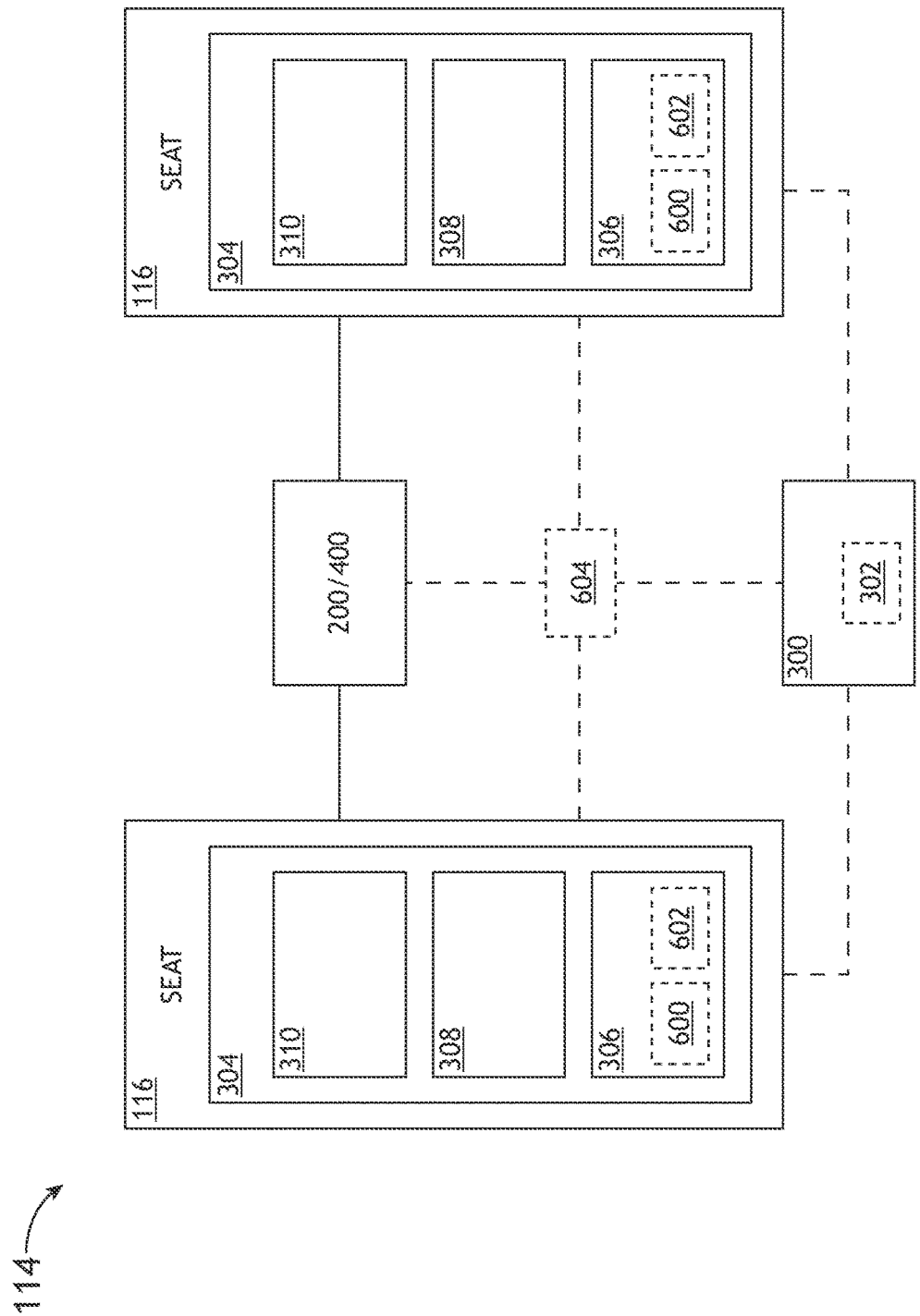
FIG. 6 illustrates a simplified block diagram view of a deployable cabin attendant seat system, in accordance with one or more embodiments of the disclosure.

Referring now to FIG. 6, the deployable cabin attendant seat system 114 may include one or more interlocking assemblies or other mechanisms configured to act on select components of the deployable cabin attendant seat system 114.

A seat pan 306 of a cabin attendant seat 116 may be held in a stowed seat pan position via a spring assembly 600. For example, the spring assembly 600 may cause the seat pan 306 to return to a stowed seat pan position when a force is not exerted on the seat pan 306 (e.g., by a cabin attendant). It is noted herein the spring assembly 600 may be instead of or in addition to the hinge assembly 314.

A seat pan 306 of a cabin attendant seat 116 may be held in a deployed seat position via an interlocking assembly 602. For example, the interlocking assembly 602 may be a mechanical or magnetic detent mechanism or other mechanism that holds or secures the seat pan 306 in the deployed seat position. For instance, the interlocking assembly 602 may be self-latching/self-releasing, may be latched/released when a force is directly applied to the seat pan 306 by the cabin attendant, and/or may be latched/released through an external component (e.g., a switch, toggle, button, or the like) or assembly acted upon by the cabin attendant.

It is noted herein the one or more handles 320 may be at least partially integrated with the interlocking assembly 602 configured to hold or secure the seat pan 306 in the stowed seat pan position. For example, the interlocking assembly 602 may include a depressible button which may create a cavity configured to operate as a handle 320 and receive a portion of a hand of a cabin attendant in the seat pan 306 when depressed, a lever configured to operate as a handle 320 to which a cabin attendant may hold or secure when engaging with the interlocking assembly 602, or the like.

The deployable cabin attendant seat system 114 may include an interlocking assembly 604 coupled to one or more of the frame or outer housing 304 of each cabin attendant seat 116, the main support 300, and/or the one or more hinge assemblies 200 or the one or more linkage assemblies 400. The interlocking assembly 604 may be configured to hold or secure the cabin attendant seat 116 in the stowed seat position and prevent the actuation of the actuating cabin attendant seat 116 until engaged.

In general, it is noted herein the interlocking assemblies 316, 602, 604 may include any mechanism or device with actuators (e.g., such as a handle, a lever, a knob, a button, a toggle, or the like), locking pins (e.g., such as tabs, protrusions, hooks, or the like), cut-outs (e.g., such as a slot, a recess, a notch, a hole, a groove, or the like), threads, or other interlocking components configured to meet aviation guidelines and/or standards (e.g., 9G load requirements, 16G load requirements, burn test requirements, or other aviation guidelines and/or standards set forth in at least the sections and corresponding Appendixes under 14 C.F.R. Part 25).

It is noted herein the deployable cabin attendant seat system 114 may be actuated manually (e.g., via a mechanical force provided directly or indirectly to the one or more cabin attendant seats 116) or electronically. Where the deployable cabin attendant seat system 114 is actuated electronically, the aircraft cabin 100 may include a control panel for actuating the deployable cabin attendant seat system 114, the control panel being coupled to an aircraft controller within the aircraft cabin 100 (e.g., within the deployable cabin attendant seat system 114, or the like).

Although embodiments of the present disclosure illustrate the deployable cabin attendant seat system 114 as being positioned in the aft of the aircraft cabin 100 and including a forward-facing set of cabin attendant seats 116, it is noted herein the positioning of the deployable cabin attendant seat system 114 is not limited to the set of cabin attendant seats 116 being positioned in the aft of the aircraft cabin 100 and/or the set of cabin attendant seats 116 being forward-facing. For example, the deployable cabin attendant seat system 114 may be configured to be installed within a fore section of the aircraft cabin 100, such that the one or more cabin attendant seats 116 may face backward. In general, the deployable cabin attendant seat system 114 may be positioned anywhere within the aircraft cabin 100 and/or be facing any direction within the aircraft cabin 100. Therefore, the above description should not be interpreted as a limitation on the present disclosure but merely an illustration.

Although embodiments of the present disclosure illustrate the deployable cabin attendant seat system 114 as including two cabin attendant seats 116, it is noted herein the deployable cabin attendant seat system 114 may include more or fewer cabin attendant seats 116, without departing from the present disclosure. Therefore, the above description should not be interpreted as a limitation on the present disclosure but merely an illustration.

Advantages of the present disclosure are directed to a deployable cabin attendant seat system 114. Advantages of the present disclosure are also directed to the deployable cabin attendant seat system 114 and its cabin attendant seats 116 being configured to allow for increased passenger seats, storage space, lavatories, and/or galley spaces, while reducing the possibility of congestion in areas of the aircraft cabin 100 while continuing to meet aviation guidelines and/or standards. For example, the deployable cabin attendant seat system 114 and its cabin attendant seats 116 does not interfere with egress areas 104 and/or openings 110 between aircraft interior structures or monuments 112 when stowed during non-TTL stages of flight.

Although embodiments of the disclosure are directed to an aviation environment such as an aircraft cabin 100, it is noted herein the deployable cabin attendant seat system 114 is not limited to the aviation environment and/or the aircraft components within the aviation environment. For example, the deployable cabin attendant seat system 114 may be configured for any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. By way of another example, the deployable cabin attendant seat system 114 may be configured for commercial or industrial use in either a home or a business. Therefore, the above description should not be interpreted as a limitation on the present disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A deployable cabin attendant seat system, comprising:
   a primary cabin attendant seat including a primary seat pan and a primary seatback, the primary seat pan being configured to actuate between a primary stowed seat pan position and a primary deployed seat pan position;
   an auxiliary cabin attendant seat including an auxiliary seat pan and an auxiliary seatback, the auxiliary seat pan being configured to actuate between an auxiliary stowed seat pan position and an auxiliary deployed seat pan position;
   a main support coupled to at least one of the primary cabin attendant seat or the auxiliary cabin attendant seat, the main support coupled to a floor of an aircraft cabin; and
   an actuation assembly coupled to at least the primary cabin attendant seat, the actuation assembly being configured to actuate the primary cabin attendant seat relative to the auxiliary cabin attendant seat between a stowed seat position and a deployed seat position,
   the primary cabin attendant seat and the auxiliary cabin attendant seat being arranged in a side-by-side configuration when the primary cabin attendant seat is in the deployed seat position,
   the primary cabin attendant seat being stacked on the auxiliary cabin attendant seat when the primary cabin attendant seat is in the stowed seat position;
   the primary cabin attendant seat being configured to face the auxiliary cabin attendant seat when the primary cabin attendant seat is in the stowed seat position stacked on the auxiliary cabin attendant seat, the primary cabin attendant seat and the auxiliary cabin attendant seat being configured to face outward when the primary cabin attendant seat is in the deployed seat position in the side-by-side configuration with the auxiliary cabin attendant seat.

2. The deployable cabin attendant seat system of claim 1, the primary cabin attendant seat being in the deployed seat position during a taxi, takeoff, or landing (TTL) stage of flight, the primary cabin attendant seat being in the stowed seat position during a non-TTL stage of flight.

3. The deployable cabin attendant seat system of claim 1, the primary cabin attendant seat being at least partially positioned within an opening defined between proximate aircraft interior structures installed in the aircraft cabin when the primary cabin attendant seat is in the deployed seat position, the opening leading to a galley from at least one of an aisle or an egress area in the aircraft cabin,
   the primary cabin attendant seat being removed from the opening when the primary cabin attendant seat is in the stowed seat position.

4. The deployable cabin attendant seat system of claim 1, the actuation assembly comprising:
   at least one hinge assembly coupled to at least the primary cabin attendant seat, the at least one hinge assembly being configured to rotate the primary cabin attendant seat relative to the auxiliary cabin attendant seat between the stowed seat position and the deployed seat position.

5. The deployable cabin attendant seat system of claim 4, the primary seat pan being configured to actuate between the primary stowed seat pan position and the primary deployed seat pan position when the primary cabin attendant seat is in the deployed seat position, the auxiliary seat pan being configured to actuate between the auxiliary stowed seat pan position and the auxiliary deployed seat pan position when the primary cabin attendant seat is in the deployed seat position.

6. The deployable cabin attendant seat system of claim 1, further comprising:
one or more interlocking assemblies configured to secure at least one of the primary cabin attendant seat in the stowed seat position, the primary cabin attendant seat in the deployed seat position, the primary seat pan in the primary stowed seat pan position, or the auxiliary seat pan in the auxiliary stowed seat pan position.

7. The deployable cabin attendant seat system of claim 1, further comprising:
one or more spring assemblies configured to hold at least one of the primary seat pan in the primary stowed seat pan position or the auxiliary seat pan in the auxiliary stowed seat pan position.

8. The deployable cabin attendant seat system of claim 1, further comprising:
one or more handles configured to assist in the actuation of at least one of the primary cabin attendant seat between the stowed seat position and the deployed seat position, the primary cabin attendant seat pan between the primary stowed seat pan position and the primary deployed seat pan position, or the auxiliary cabin attendant seat pan between the auxiliary stowed seat pan position and the auxiliary deployed seat pan position.

9. An aircraft cabin, comprising:
a deployable cabin attendant seat system positioned proximate to at least one aircraft interior structure, the deployable cabin attendant seat system comprising:
a primary cabin attendant seat including a primary seat pan and a primary seatback, the primary seat pan being configured to actuate between a primary stowed seat pan position and a primary deployed seat pan position;
an auxiliary cabin attendant seat including an auxiliary seat pan and an auxiliary seatback, the auxiliary seat pan being configured to actuate between an auxiliary stowed seat pan position and an auxiliary deployed seat pan position;
a main support coupled to at least one of the primary cabin attendant seat or the auxiliary cabin attendant seat, the main support coupled to a floor of the aircraft cabin; and
an actuation assembly coupled to at least the primary cabin attendant seat, the actuation assembly being configured to actuate the primary cabin attendant seat relative to the auxiliary cabin attendant seat between a stowed seat position and a deployed seat position,
the primary cabin attendant seat and the auxiliary cabin attendant seat being arranged in a side-by-side configuration when the primary cabin attendant seat is in the deployed seat position,
the primary cabin attendant seat being stacked on the auxiliary cabin attendant seat when the primary cabin attendant seat is in the stowed seat position;
the primary cabin attendant seat being configured to face the auxiliary cabin attendant seat when the primary cabin attendant seat is in the stowed seat position stacked on the auxiliary cabin attendant seat, the primary cabin attendant seat and the auxiliary cabin attendant seat being configured to face outward when the primary cabin attendant seat is in the deployed seat position in the side-by-side configuration with the auxiliary cabin attendant seat.

\* \* \* \* \*